United States Patent
Jayaraman et al.

(10) Patent No.: US 12,443,842 B2
(45) Date of Patent: Oct. 14, 2025

(54) SYSTEMS, METHODS, AND COMPUTER READABLE MEDIA FOR VESSEL RENDEZVOUS DETECTION AND PREDICTION

(71) Applicant: Global Spatial Technology Solutions Inc., Dartmouth (CA)

(72) Inventors: Dhivya Jayaraman, Halifax (CA); Renata Queiroz Dividino, St. Catharines (CA); Katherine Borda Ceballos, London (CA); Juan Manuel Carrillo Garcia, London (CA); Benjamin Kurtis Friedrich, Halifax (CA); Ana Luisa Alfaro Suzan, North York (CA)

(73) Assignee: Global Spatial Technology Solutions Inc., Dartmouth (CA)

( * ) Notice: Subject to any disclaimer, the term of this patent is extended or adjusted under 35 U.S.C. 154(b) by 470 days.

(21) Appl. No.: 17/347,339

(22) Filed: Jun. 14, 2021

(65) Prior Publication Data
US 2022/0398448 A1  Dec. 15, 2022

(51) Int. Cl.
*G06N 3/08* (2023.01)
*B63B 79/40* (2020.01)
(Continued)

(52) U.S. Cl.
CPC .............. *G06N 3/08* (2013.01); *B63B 79/40* (2020.01); *G01C 21/203* (2013.01); *G06N 3/044* (2023.01)

(58) Field of Classification Search
CPC ........ G06N 3/08; G06N 3/044; G06N 3/0442; G06N 3/045; G06N 3/0464; G06N 3/09; B63B 79/40; G01C 21/203; G08G 3/02
See application file for complete search history.

(56) References Cited

U.S. PATENT DOCUMENTS 10,399,650 B2 * 9/2019 Delay .................. G08G 3/00
10,830,907 B2 11/2020 Anderson et al.
(Continued)

FOREIGN PATENT DOCUMENTS

CN 111721321 A * 9/2020 ............. G01C 21/22
CN 110322731 B * 8/2021 ............... G08G 3/02

OTHER PUBLICATIONS

Duchi et al., Adaptive Subgradient Methods for Online Learning and Stochastic Optimization, Journal of Machine Learning Research 12 (2011), pp. 2121-2159.
(Continued)

*Primary Examiner* — Peter D Nolan
*Assistant Examiner* — Demetra R Smith-Stewart
(74) *Attorney, Agent, or Firm* — SMART & BIGGAR LP; Isis E. Caulder

(57) ABSTRACT

Provided are systems, methods, and computer readable media for predicting a vessel rendezvous, and systems, methods, and computer readable media for generating a vessel rendezvous prediction model. The method can include generating or receiving a rendezvous a rendezvous prediction model; receiving vessel data for a plurality of vessels from one or more sources; constructing a vessel trajectory for each vessel of the plurality of vessels based on the vessel data, each vessel trajectory comprising one or more trajectory segments; providing the plurality of constructed vessel trajectories to the rendezvous prediction model; and generating, at the processor, a rendezvous prediction output from the rendezvous prediction model.

16 Claims, 23 Drawing Sheets

(51) Int. Cl.
    *G01C 21/20*     (2006.01)
    *G06N 3/04*     (2023.01)
    *G06N 3/044*     (2023.01)

(56) References Cited

U.S. PATENT DOCUMENTS

| | | | |
|---|---|---|---|
| 2009/0207020 A1* | 8/2009 | Garnier | G08B 31/00 340/541 |
| 2016/0363671 A1* | 12/2016 | Anderson | G01C 21/14 |
| 2018/0203125 A1* | 7/2018 | Delay | G06T 7/73 |
| 2018/0205444 A1* | 7/2018 | Delay | G06V 40/172 |
| 2020/0184828 A1* | 6/2020 | Mazor | B63B 79/30 |
| 2020/0264268 A1 | 8/2020 | Moore et al. | |
| 2020/0264296 A1* | 8/2020 | Dunagan | G08G 3/00 |
| 2020/0410301 A1* | 12/2020 | Delay | G08G 3/00 |
| 2022/0253763 A1* | 8/2022 | Dividino | G06N 3/04 |
| 2022/0301721 A1* | 9/2022 | Dividino | G16H 50/70 |

OTHER PUBLICATIONS

Liu et al., SSD: Single Shot MultiBox Detector, Computer Vision—ECCV 2016. Lecture Notes in Computer Science, vol. 9905. Springer, Cham, pp. 1-17.

Ren et al., Faster R-CNN: Towards Real-Time Object Detection with Region Proposal Networks, 2016, arXiv:1506.01497v3, pp. 1-14.

Howard et al., MobileNets: Efficient Convolutional Neural Networks for Mobile Vision Applications, Google Inc., 2017, arXiv:1704.04861v1, pp. 1-9.

Kingma and Ba., ADAM: a Method for Stochastic Optimization, 2017, arXiv:1412.6980v9, pp. 1-15.

Patroumpas et al. Online event recognition from moving vessel trajectories. GeoInformatica. Apr. 2017;21(2):389-427.

Lin et al., Focal Loss for Dense Object Detection, Facebook AI Research (FAIR), 2018, arXiv:1708.02002v2, pp. 1-10.

Vouros et al. Big data analytics for time critical maritime and aerial mobility forecasting. Advances in Database Technology—EDBT. 2018;2018:612-23.

Varlamis et al. A Network Abstraction of Multi-vessel Trajectory Data for Detecting Anomalies. InEDBT/ICDT Workshops Mar. 2019 (vol. 2019).

Hinton et al., Neural Networks for Machine Learning—Lecture 6a Overview of mini-batch gradient descent, received copy on May 13, 2021, pp. 1-30.

Varlamis et al. Building navigation networks from multi-vessel trajectory data. GeoInformatica. Jan. 2021;25(1):69-97.

International Search Report and Written Opinion mailedSep. 12, 2022 in International Patent Application No. PCT/CA2022/050939 (9 pages).

* cited by examiner

| ID | Timestamp (UTC) | Latitude (deg) | Longitude (deg) | RF Frequency (MHz) | Pulse duration (ns) | Pulses repetition frequency (Hz) | Accuracy |
|---|---|---|---|---|---|---|---|
| 1 | 2020-06-30 21:49:40.43 | 24.6 | 126.688 | 3049.4 | 1097.1 | 507 | High |
| 2 | 2020-06-30 21:49:40.436 | 24.51 | 124.525 | 3049.6 | 620.5 | 843.1 | High |
| 3 | 2020-06-30 21:49:40.43 | 24.999 | 127.123 | 3049.1 | 1118 | 469.1 | High |
| 4 | 2020-06-30 21:49:40.43 | 25.546 | 125.776 | 3050.1 | 455 | 1029 | High |

SYSTEMS, METHODS, AND COMPUTER READABLE MEDIA FOR VESSEL RENDEZVOUS DETECTION AND PREDICTION

FIELD

The described embodiments relate to determining vessel rendezvous, and specifically to analyzing vessel data in order to determine and/or predict a vessel rendezvous with at least one other vessel at sea.

BACKGROUND

Global shipping poses many risks, including national security risks, risks related to communicable diseases, supply chain disruptions, and variable costs (including loading/unloading costs and insurance costs). Coast guard and naval resources are limited because the regions they are responsible for monitoring and protecting are very large, and not every vessel can be inspected.

Shipping vessels are tracked using vessel tracking devices such as Automatic Identification Systems (AIS) that include vessel-based transceiver systems. Each vessel transmits data including unique identification, position, course, and speed, amongst other things. The vessel may receive and display this information on an electronic chart display and information system (ECDIS). Shore-based tracking can include AIS base stations, and vessel traffic services (VTS) that may be provided at a harbor or port which provide functionality similar to air traffic control systems for aircraft.

AIS transceivers have been mandatory since the International Maritime Organization's (IMO) International Convention for the Safety of Life at Sea (SOLAS) for international voyaging ships with 300 or more gross tonnage (GT), and all passenger ships regardless of size. AIS has been implemented first as a terrestrial-based system (T-AIS) and later as a satellite-based system (S-AIS).

AIS data may be used to track vessels. AIS itself however, does not provide vessel rendezvous detection information for a vessel, nor predictions of vessel rendezvous. Additionally, AIS data does not provide risk protection for vessels which disable, spoof, or otherwise make malicious use of the transmitted data.

Shipping vessels may also be tracked using based on radio-frequency (RF) transmissions such as from those received from shore-based or satellite based RF receivers. Shipping vessels may also be tracked based on satellite imagery data including visual and infra-red imaging of the earth including the seas.

While some vessel rendezvous are legal, increasingly vessel rendezvous are a high-risk practice that is frequently used to mask illegal practices at sea. Rendezvous can be performed for many different illegal purposes, including human trafficking, cargo transshipping, laundering of stolen goods, drug smuggling, and laundering of restricted goods including illegally caught fish. Human trafficking by way of vessel transshipping may include persons trafficked for sexual exploitation or for forced labour, including aboard the vessels themselves. Transshipping of illegal drugs may be performed in order to hide the origin of the drugs, or to provide cover for the transport of the drugs. The transshipping of illegally caught fish, especially on the high seas and in waters surrounding developing and small island nations with insufficient resources to police their waters is problematic for the food supply of these nations because resources vital to their survival are diverted to larger markets. Rendezvous at sea carries other risks, including the transmission of communicable diseases between different vessel crews.

There is a need therefore for port authorities, national governments, public health organizations, and shipping companies to be able to quickly and accurately detect and predict vessel rendezvous at sea that may represent a threat to the port authority or national government.

For at least these reasons, there exists a need for an improved system and method for detecting and predicting vessel rendezvous at sea, including providing alerts of rendezvous.

SUMMARY

In a first aspect there is provided a computer implemented method for predicting a vessel rendezvous, the method comprising: receiving, at the processor, a rendezvous prediction model; receiving, at a processor, vessel data for a plurality of vessels from one or more sources; constructing, at the processor, a vessel trajectory for each vessel of the plurality of vessels based on the vessel data, each vessel trajectory comprising one or more trajectory segments; providing, at the processor, the plurality of constructed vessel trajectories to the rendezvous prediction model; and generating, at the processor, a rendezvous prediction output from the rendezvous prediction model.

In one or more embodiments, the method may further comprise: receiving, at the processor, region boundaries data from a region boundaries data source, the region boundaries data may describe a plurality of regional boundaries; enhancing, at the processor, the vessel data with the plurality of region boundaries based on the region boundaries data; and wherein each of the plurality of constructed vessel trajectories may be constructed based on the enhanced vessel data.

In one or more embodiments, the rendezvous prediction output may comprise an output selected from the group of: no rendezvous threat, threat of an imminent rendezvous, and involved in a rendezvous.

In one or more embodiments, the method may further comprise: receiving, at the processor, a rendezvous type classification model; converting, at the processor, the one or more trajectory segments of the plurality of constructed vessel trajectories corresponding to the predicted rendezvous output into images; providing, at the processor, the images to the rendezvous type classification model; and generating, at the processor, a rendezvous type classification output from the rendezvous type classification model.

In one or more embodiments, the vessel data may comprise at least one selected from the group of AIS data source, vessel information data from a vessel information source, radio frequency vessel data from a satellite radio frequency data source, satellite image data from an optical satellite image data source, and satellite image data from a radar satellite image data source.

In one or more embodiments, the rendezvous prediction model may comprise a convolution neural network.

In one or more embodiments, the rendezvous type classification output may comprise at least one selected from the group of a path crossing type, a parallel course type and a loitering in the same vicinity type.

In a second aspect, there is provided a vessel rendezvous prediction system, the system comprising: a memory comprising: a rendezvous prediction model; a network device; a processor in communication with the memory and the network device, the processor configured to: receive, via the network device, vessel data for a plurality vessels from one or more sources; construct a vessel trajectory for each vessel in the plurality of vessels based on the vessel data, each vessel trajectory comprising one or more trajectory segments; provide the plurality of constructed vessel trajectories as input to the rendezvous prediction model; and generate a rendezvous prediction output from the rendezvous prediction model.

In one or more embodiments, the processor may be further configured to: receive, via the network device, region boundaries data from a region boundaries data source, the region boundaries data describing a plurality of regional boundaries; enhance the vessel data with the plurality of region boundaries based on the region boundaries data; and wherein each of the plurality of constructed vessel trajectories may be based on the enhanced vessel data.

In one or more embodiments, the rendezvous prediction output may comprise an output selected from the group of: no rendezvous threat, threat of an imminent rendezvous, and involved in a rendezvous.

In one or more embodiments, the memory may further comprise a rendezvous type classification model; and wherein the processor may be further configured to: convert the one or more trajectory segments of the plurality of vessel trajectories corresponding to predicted rendezvous output into images; provide the images to the rendezvous type classification model as input; and generate a rendezvous type classification output from the rendezvous type classification model.

In one or more embodiments, the vessel data may comprise at least one selected from the group of AIS data source, vessel information data from a vessel information source, radio frequency vessel data from a satellite radio frequency data source, satellite image data from an optical satellite image data source, and satellite image data from a radar satellite image data source.

In one or more embodiments, the rendezvous prediction model may comprise a convolution neural network.

In one or more embodiments, the rendezvous type classification output may comprise at least one selected from the group of a path crossing type, a parallel course type and a loitering in the same vicinity type.

In a third aspect, there is provided a non-transitory computer-readable medium with instructions stored thereon for predicting a vessel rendezvous, that when executed by a processor, performs any one of the methods described herein.

In a fourth aspect, there is provided a computer implemented method for generating a rendezvous prediction model, the method comprising: receiving, at a processor, vessel data for a plurality of vessels from one or more sources; constructing, at the processor, a vessel trajectory for each vessel in the plurality of vessels based on the vessel data, each vessel trajectory comprising one or more trajectory segments; identifying, at the processor, one or more identified trajectory segments of the plurality of constructed vessel trajectories based on an unstable speed detection corresponding to the one or more trajectory segments; detecting, at the processor, a rendezvous between a first vessel and a second vessel of the plurality of vessels, based on the one or more identified trajectory segments; labeling a first vessel trajectory of the first vessel and a second vessel trajectory of the second vessel based on data stored in the vessel rendezvous history database; storing the detected rendezvous and the determined type of the detected rendezvous in a vessel rendezvous history database in association with a first unique vessel identifier corresponding to the first vessel, a second unique vessel identifier corresponding to the second vessel, a location of the detected rendezvous and a time of occurrence of the detected rendezvous; and generating a rendezvous prediction model based on the labeled dataset, the rendezvous prediction model for predicting a rendezvous for a candidate vessel trajectory.

In one or more embodiments, the method may further comprise: receiving, at the processor, region boundaries data from a region boundaries data source, the region boundaries data describing a plurality of regional boundaries; enhancing, at the processor, the vessel data with the plurality of regional boundaries based on the region boundaries data; and wherein the constructing the plurality of constructed vessel trajectories may be further based on the enhanced vessel data.

In one or more embodiments, the method may further comprise: determining a type of the detected rendezvous based on the plurality of constructed vessel trajectories corresponding to the first vessel and the second vessel.

In one or more embodiments, the method may further comprise: storing, at a memory in communication with the processor, the plurality of constructed vessel trajectories in a vessel trajectories database; and storing, at the memory, the generated rendezvous prediction model.

In one or more embodiments, the method may further comprise: generating, at the processor, an alarm based on the detected rendezvous.

In one or more embodiments, the labeling may comprise labeling the stored plurality of constructed vessel trajectories using a label selected from the group of: no rendezvous threat, threat of an imminent rendezvous, and involved in a rendezvous.

In one or more embodiments, the rendezvous prediction model may comprise a long short term memory network.

In one or more embodiments, the method may further comprise: converting one or more trajectory segments of the plurality of constructed vessel trajectories labeled "involved in a rendezvous" into images; classifying the images into one or more types; generating a rendezvous type classification model based on the classified images; and storing the generated rendezvous type classification model in a database.

In one or more embodiments, the rendezvous type classification model may comprise a convolution neural network.

In one or more embodiments, the one or more types may include a type selected from a list comprising: path crossing type, parallel course type and loitering in the same vicinity type.

In one or more embodiments, the vessel data may include one or more of an AIS data from an AIS data source, a vessel information data from a vessel information source, a radio frequency vessel data from a satellite radio frequency data source, satellite image data from an optical satellite image data source, and satellite image data from a radar satellite image data source.

In one or more embodiments, the method may further comprise: identifying and classifying a vessel in the satellite image data using a Deep Learning method.

In a fifth aspect, there is provided a system for generating a rendezvous prediction model, the system comprising: a memory; a network device; a processor in communication with the memory and the network device, the processor configured to: receive, via the network device, vessel data for a plurality of vessels from one or more sources; construct a vessel trajectory for each vessel in the plurality of vessels based on the vessel data, each vessel trajectory comprising one or more trajectory segments; identify one or more identified trajectory segments of the plurality of constructed vessel trajectories based on an unstable speed detection corresponding to the one or more trajectory segments; detect a rendezvous between a first vessel and a second vessel of the plurality of vessels, based on the one or more identified trajectory segments; label a first vessel trajectory of the first vessel and a second vessel trajectory of the second vessel based on data stored in the vessel rendezvous history database; store, in the memory, the detected rendezvous and the determined type of the detected rendezvous in a vessel rendezvous history database in association with a first unique vessel identifier corresponding to the first vessel, a second unique vessel identifier corresponding to the second vessel, a location of the detected rendezvous and a time of occurrence of the detected rendezvous; and generate a rendezvous prediction model based on the labeled dataset, the rendezvous prediction model for predicting a rendezvous for a candidate vessel trajectory.

In one or more embodiments, the processor may be further configured to determine a type of the detected rendezvous based on the plurality of constructed vessel trajectories corresponding to the first vessel and the second vessel.

In one or more embodiments, the processor may be further configured to: store, at the memory, the plurality of constructed vessel trajectories in a vessel trajectories database; and store, in the memory, the generated rendezvous prediction model.

In one or more embodiments, the processor may be further configured to generate an alarm based on the detected rendezvous.

In one or more embodiments, the labeling may comprise labeling the stored plurality of constructed vessel trajectories using a label selected from the group of: no rendezvous threat, threat of an imminent rendezvous, and involved in a rendezvous.

In one or more embodiments, the rendezvous prediction model may comprise a long short term memory network.

In one or more embodiments, the processor may be further configured to: convert one or more trajectory segments of the plurality of constructed vessel trajectories labeled "involved in a rendezvous" into images; classify the images into one or more types; generate a rendezvous type classification model based on the classified images; and store the generated rendezvous type classification model in a database in the memory.

In one or more embodiments, the rendezvous type classification model may comprise a convolutional neural network.

In one or more embodiments, the one or more types may include a type selected from a list comprising: path crossing type, parallel course type and loitering in the same vicinity type.

In one or more embodiments, the vessel data may include one or more of an AIS data from an AIS data source, a vessel information data from a vessel information source, a radio frequency vessel data from a satellite radio frequency data source, satellite image data from an optical satellite image data source, and satellite image data from a radar satellite image data source.

In one or more embodiments, the processor may be further configured to identify and classify a vessel in the satellite image data using a Deep Learning method.

In a sixth aspect, there is provided a non-transitory computer-readable medium with instructions stored thereon for predicting a vessel rendezvous, that when executed by a processor, performs any one of the methods described herein.

BRIEF DESCRIPTION OF THE DRAWINGS

A preferred embodiment will now be described in detail with reference to the drawings, in which.

DESCRIPTION OF EXEMPLARY EMBODIMENTS

Figure 1:
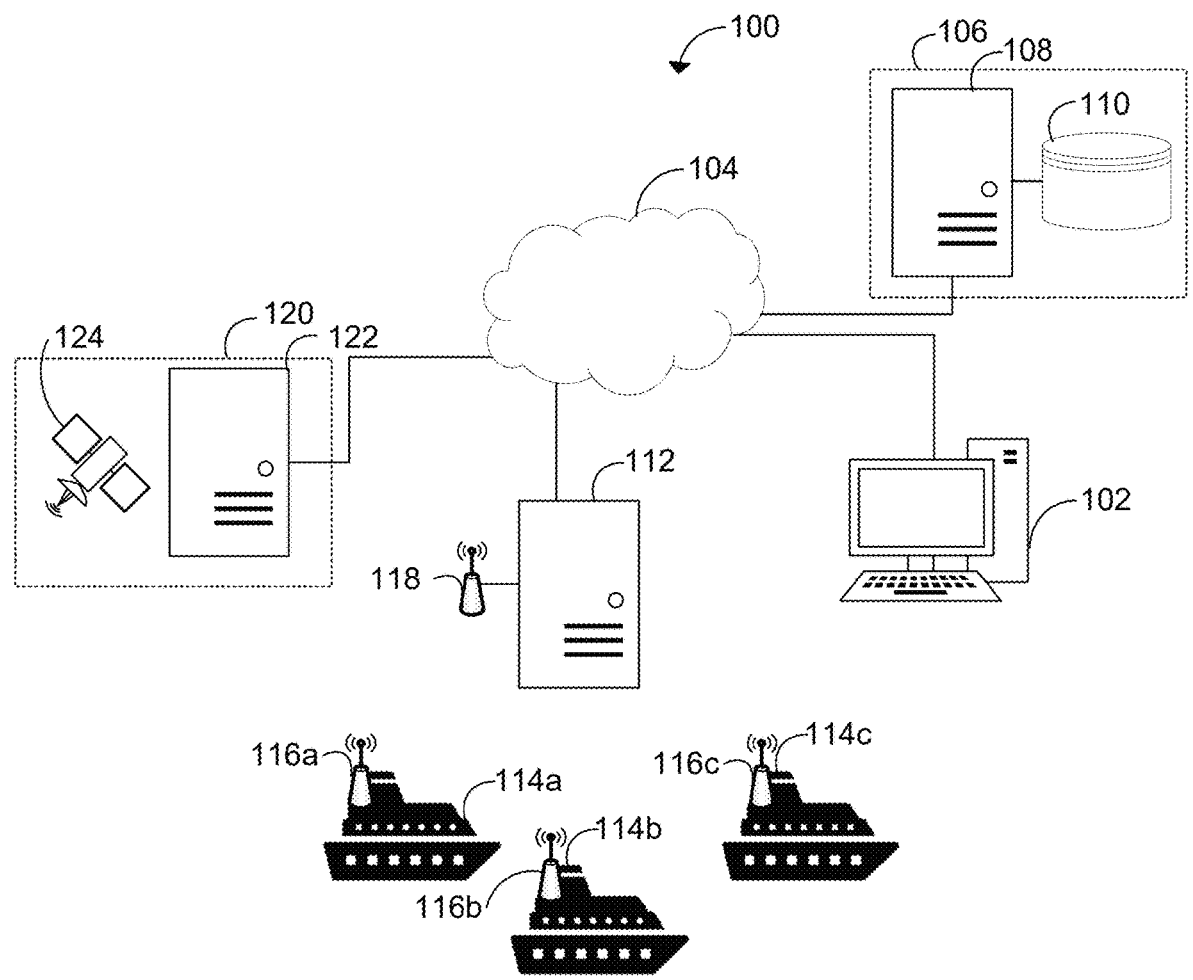
FIG. 1 shows a system diagram of a system for vessel rendezvous detection and prediction in accordance with one or more embodiments.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers (referred to below as computing devices) may be a server, network appliance, embedded device, computer expansion module, personal computer, laptop, personal data assistant, cellular telephone, smart-phone device, tablet computer, wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and a combination thereof.

Program code may be applied to input data to perform the functions described herein and to generate output information. The output information is applied to one or more output devices, in known fashion.

Each program may be implemented in a high-level procedural or object-oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloads, magnetic and electronic storage media, digital and analog signals, and the like. The computer useable instructions may also be in various forms, including compiled and non-compiled code.

Various embodiments have been described herein by way of example only. Various modifications and variations may be made to these example embodiments without departing from the spirit and scope of the invention, which is limited only by the appended claims. Also, in the various user interfaces illustrated in the figures, it will be understood that the illustrated user interface text and controls are provided as examples only and are not meant to be limiting. Other suitable user interface elements may be possible.

As recited herein, vessel tracking systems may include Automatic Identification Systems (AIS), and other such vessel tracking systems whether terrestrial-based or satellite-based.

Reference is first made to FIG. 1, showing a system drawing 100 of a system for vessel rendezvous detection and prediction. The system 100 has a user device 102, a network 104, an assessment service 106 having a server 108 and a database 110, at least one vessel tracking provider server 112 having a vessel tracking transceiver 118, at least one vessel 114 having a vessel tracking transceiver 116, at least one satellite data provider 120 having a satellite server 122 and a satellite 124. The at least one satellite data provider 120 may include optical satellite image providers, radar satellite image providers, and satellite radio frequency data providers.

User devices 102 may be used by an end-user to access an application (not shown) running on assessment service 106. For example, the application may be a web application, or a client/server application. The user devices 102 may be a desktop computer, mobile device or laptop computer. The user devices 102 may be in network communication with assessment service 106 via network 104. The user devices 102 may display the application and may allow a user to review detected and/or predicted vessel rendezvous of at least one of the vessels 114. The end user may be from a government agency such as the Coast Guard, a public health organization, a defense organization such as the Navy, a corporate organization such as an international shipping company, or another interested party.

Network 104 may be a communication network such as the Internet, a Wide-Area Network (WAN), a Local-Area Network (LAN), or another type of network. Network 104 may include a point-to-point connection, or another communications connection between two nodes.

Assessment service 106 includes one or more servers 108 and one or more databases 110 for detecting and predicting vessel rendezvous. Assessment service 106 may provide software services to the user device 102 and may communicate with at least one vessel tracking provider server 112 to receive vessel tracking data. The assessment service 106 may further communicate with at least one satellite data providers 120, including a satellite radio frequency data provider, an optical satellite image data provider, and a radar satellite image data provider. The assessment service 106 may further communicate with other data providers (not shown), including 3$^{rd}$ party data providers for vessel incident information, vessel information, and regional boundary information.

Assessment service 106 may provide a web application that is accessible by the user devices 102. The web application may provide user authentication functionality as known, so that a user may create an account and/or log into the web application in order to request or receive vessel rendezvous information including detected vessel rendezvous events or predicted vessel rendezvous events. The assessment service 106 may provide the vessel rendezvous detection and prediction functionality to a user as described herein.

Assessment service 106 may implement an Application Programming Interface (API) to receive requests from the user devices 102, or from a third party (not shown). The assessment service 106 may reply to the API requests with API responses, and the API responses may provide the functionality of the web application provided by assessment service 106. The API may receive requests and send responses in a variety of formats, such as JavaScript Object Notation (JSON) or eXtensible Markup Language (XML).

The assessment service API may receive requests from an application running on the user devices 102. The application running on the user devices 102 may be downloaded from the web application provided at assessment service 106 or may be downloaded from the Google® Play Store or the Apple® App Store.

Server 108 is connected to network 104 and database 110 and may provide functionality as described herein. The server may implement one or more external APIs, as described above. The server 108 may be a physical server, may be the same server device as the device running the database 110, or may be provided by a cloud provider such as Amazon® Web Services (AWS).

Server 108 may have a web server provided thereon for providing web-based access to the software application providing the API and/or the software application providing the web application. The web server may be one such as Apache®, Microsoft® IIS®, etc. The software application providing the API and the web application may be Apache® Tomcat, Ruby on Rails, or another web application framework as known.

The database 110 is connected to network 104 and may store historical data for a number of vessels, including regional boundaries (including data received from an external data source, and data determined or generated by the assessment service itself), vessel tracking data (for example, including AIS data received from an AIS data vendor), and vessel data (including vessel data received by a vessel data vendor).

The database 110 may further store historical vessel rendezvous data, including historical satellite radio-frequency data, historical satellite image data (including both optical-based and radar-based data) associated with vessel rendezvous.

The database 110 may further store historical vessel information including historical vessel Maritime Mobile Service Identity (MMSI) information. The database 110 may store other historical information such as historical vessel behavior tracking information and historical vessel abnormal behavior information.

The database 110 may further store generated profiles determined by the assessment service. The generated profiles include statistical information for vessels, including statistical information such as vessel Maritime Mobile Service Identity (MMSI) profiles, vessel name profiles, vessel destination profiles, vessel visit duration profiles, vessel trip duration profiles, vessel movement profiles, vessel speed profiles, vessel tracking transmission profiles, vessel tracking position accordance profiles, vessel sea route profiles, vessel crew size profiles, vessel incident profiles, and vessel rendezvous profiles. The statistical information in the generated profiles may be determined for each vessel, for a type of vessel (including size or manufacturer), or a combination of these factors. The database 110 may be a Structured Query Language (SQL) such as PostgreSQL or MySQL or a not only SQL (NoSQL) database such as MongoDB. For example, vessel profiles may include historical behavior change frequency distribution information as described herein.

Vessel tracking provider server 112 may be a first party server which is within the same organization as the assessment server 106, for example, a shore-based or satellite-based AIS receiver. Alternatively, the vessel tracking provider server 112 may be a third-party provider, such as exactEarth®, ORBCOMM®, Spacequest®, or Spire®. The assessment service 106 may receive vessel tracking data from multiple different vessel tracking provider servers 112.

The vessel tracking provider server 112 may have a vessel tracking transceiver 118 that receives vessel tracking transmissions of the at least one vessel 114. The vessel tracking transmissions may include a plurality of data as described herein about each vessel and its location. The vessel tracking provider may provide an API for the assessment service 106 to request periodic vessel tracking transmission data to be transferred. The vessel tracking provider may alternatively push vessel tracking transmission data to an API at the assessment service 106.

The vessel tracking provider server 112 may provide vessel tracking data in a plurality of formats and standards. In an exemplary embodiment, the vessel tracking provider server 112 may provide AIS data according to the International Maritime Organization (IMO) International Convention for the Safety of Life at Sea (SOLAS) treaty. The vessel tracking provider server 112 may perform pre-processing of vessel tracking data that is received by the vessel tracking transceiver 118.

As disclosed herein, vessel tracking data may allow ships and shore-based stations to view marine traffic in a geographical area. For example, the vessel tracking data may be displayed on a chartplotter. Alternatively, vessel tracking transceiver signals for a geographical area may be viewed via a computer using one of several computer applications such as ShipPlotter and Gnuais.

Vessel tracking transceiver 118 may demodulate the signal from a modified marine VHF radiotelephone tuned to the vessel tracking frequencies and convert into a digital format that the vessel tracking provider server 112 can read, store in memory, transmit over network 104, or display (not shown). The vessel tracking data received by vessel tracking transceiver 118 and vessel tracking provider server 112 may then be shared via network 104 using TCP or UDP protocols as are known.

The vessel tracking transceiver 118 may be limited to the collective range of the radio receivers used in the network as the vessel tracking provider system. In one embodiment, the vessel tracking provider system may have a network of shore-based vessel tracking transceivers to provide broader geographical coverage. In another embodiment, the vessel tracking provider system may have a network of satellite-based vessel tracking transceivers that may be used to receive vessel tracking transmissions from earth orbit.

Vessel tracking transceiver 118 may be a satellite receiver, or a dedicated VHF vessel tracking transceiver. The vessel tracking transceiver may receive AIS signals from local traffic for viewing on an AIS enabled chartplotter, or using an AIS compatible computer system. Port authorities or other shore-based facilities may be equipped with transceivers. Vessel tracking transceiver 118 may transmit in the Very High Frequency (VHF) range, with a transmission distance of about 10-20 nautical miles.

In the exemplary example of an AIS vessel tracking system, transceiver 118 may use the globally allocated Marine Band channels 87 and 88. AIS transceiver 118 may use the high side of the duplex from two VHF radio "channels" (87B) and (88B). For example, the AIS transceiver may use channel A 161.975 MHz (87B) and channel B 162.025 MHz (88B).

Vessel tracking transceiver 118 may provide information such as a vessel's identity, vessel type, vessel position, vessel course, vessel speed, vessel navigational status and other vessel safety-related information automatically to appropriately equipped shore stations, other ships and aircraft. Vessel tracking transceiver 118 may receive automatically such information from similarly fitted ships, may monitor and track ships; and may exchange data with shore-based facilities.

At least one vessel 114 may carry an AIS transceiver according to SOLAS regulation V/19—Carriage requirements for shipborne navigational systems and equipment. This regulation requires that AIS transceivers be fitted aboard all ships of 300 gross tonnage and upwards engaged on international voyages, cargo ships of 500 gross tonnage and upwards not engaged on international voyages and all passenger ships irrespective of size. The vessels 114 may be a variety of different types of vessels, including sailboats, shipping vessels, motorboats, yachts, passenger vessels, ferries, etc. There may be some vessels not required under SOLAS regulation who elect to fit AIS transceivers anyways.

Vessel tracking transceivers 116 aboard vessels 114 may function the same as vessel tracking transceiver 118, but may be designed for operation on a vessel (i.e. sizing, electrical power requirements, etc.). Further, each vessel 114 may transmit its location using its corresponding vessel tracking transceiver 116. This may allow vessels to provide their location to other vessels to ensure awareness and visibility of their vessel.

The at least one satellite provider 120 may be a first party, or a third-party service that may collect and store satellite data collected from one or more satellites 124 above the Earth.

The satellite provider 120 may include a satellite server 122 and a satellite 124 in communication with the satellite server 122. The at least one satellite provider 120 may include optical satellite image providers, radar satellite image providers, and satellite radio frequency data providers. The satellite server 122 may collect data from the one or more satellites 124, and provide services for the assessment service 106 including push or pull communication of the satellite data.

For example, the optical satellite image provider may be one such as Sentinel-2 mission or PlanetScope and may provide satellite image data of the earth, and may provide regularly updated image data and may "revisit" the same locations. There may be one or more optical satellite image providers.

Sentinel-2 is a mission led by the European Space Agency (ESA) with participation from industry and academic partners. It may include a constellation of two identical satellites launched and carefully positioned to offer the highest possible revisit time. Both satellites of the identical pair may carry a multispectral sensor collecting images at a spatial resolution that ranges from 10 m to 60 m, facilitating monitoring of the natural and built environment.

PlanetScope is a commercial data product sold by Planet. The raw images may be collected by a constellation of more than 130 micro satellites and in combination may observe the entire Earth's surface every day. The PlanetScope constellation may offer worldwide coverage and a daily revisit time, producing images at a resolution of approximately 3.7 meters.

For example, the radar satellite image providers may include the RADARSAT Constellation Mission (RCM) or Sentinel-1. There may be one or more radar satellite image providers.

The RADARSAT Constellation Mission (RCM) is the latest generation of Earth observation satellites developed by the Government of Canada. Its multiple imaging modes may allow the collection of data at a spatial resolution ranging from 1 m to 100 m depending on the beam mode, angle of incidence, number of looks, and polarization.

The Sentinel-1 mission is part of the Copernicus program, a joint initiative from the European Space Agency (ESA) and the European Commission (EC) to provide Earth observation data products. The Sentinel-1 mission may collect data in the C-band using the Synthetic Aperture Radar (SAR) technology and therefore can see through clouds and is not affected by weather conditions such as rain, fog, or falling snow. With four imaging modes, the mission offers data products with a spatial resolution that ranges from −5 m to −100 m enabling collection of fine detail on small zones or quick coverage over large areas.

For example, the satellite radio frequency data provider may include marine radar classified under the x-band (10 GHz) or S-band (3 GHz) frequencies which may be ingested (see FIG. 3) and stored by assessment service 106.

A significant number of marine radars operate on X-band. X-band is widely used because of the ability to use smaller antennas that fit on most boats which may provide better target resolution. S-band radars are often used for specialized applications, such as seeing through heavy weather or precipitation and for long-range bird detection. S-band antennas are larger. For example, the smallest Furuno S-band antenna is 9 feet long and can be as long as 12 feet.

X-band radars may be installed on most large research vessels, and on many offshore installations. Their original use was for ship traffic control and navigation. However, with the addition of some hardware and software components, X-band radars may additionally be used to measure waves and currents. X-band radar is a segment of the microwave radio region of the electromagnetic spectrum, generally within the frequency range 8-12 GHz.

The images produced by marine radars such as a radio-frequency data provider may detect not only hard targets such as ships and coastlines, but also reflections from the sea surface, known as 'sea clutter'. These reflections may contain valuable information on the actual sea state (i.e. wind, waves, currents, or other information). X-band radar systems may scan the ocean surface in real time at high temporal (1-2 s) and spatial (5-10 m) resolution. An area of sea surface of several square kilometers may therefore be continuously monitored using X-band radar. X-band radar systems may be installed on moving vessels or on fixed platforms offshore or at coastal sites.

Lower-frequency S-band radars (about 2 to 4 GHz) may lack the resolution and clutter resistance of higher-frequency radar systems, but may detect targets across greater distances than higher-frequency systems. S-band radars therefore may be used especially in rain or fog, and for identification and tracking of vessels.

The satellite provider 120 may implement an Application Programming Interface (API) to receive requests from the assessment service 106. The satellite provider 120 may reply to the API requests with API responses, and the API responses may provide the satellite data to assessment service 106. The API may receive requests and send responses in a variety of formats, such as JavaScript Object Notation (JSON), eXtensible Markup Language (XML), or Comma-Separated Values (CSV).

Server 122 is connected to network 104 and database 124 and may provide satellite data as described herein. The server 122 may implement one or more external APIs, as described above. The server 122 may be a physical server, or may be provided by a cloud provider such as Amazon® Web Services (AWS).

The satellite 124 is connected to server 122 and may be a satellite in Earth's orbit performing data collection. The satellite data may include optical images, radar images, and radio-frequency data. The satellite 124 may be in geostationary orbit, lower earth orbit, or another Earth orbit as known.

Figure 2:
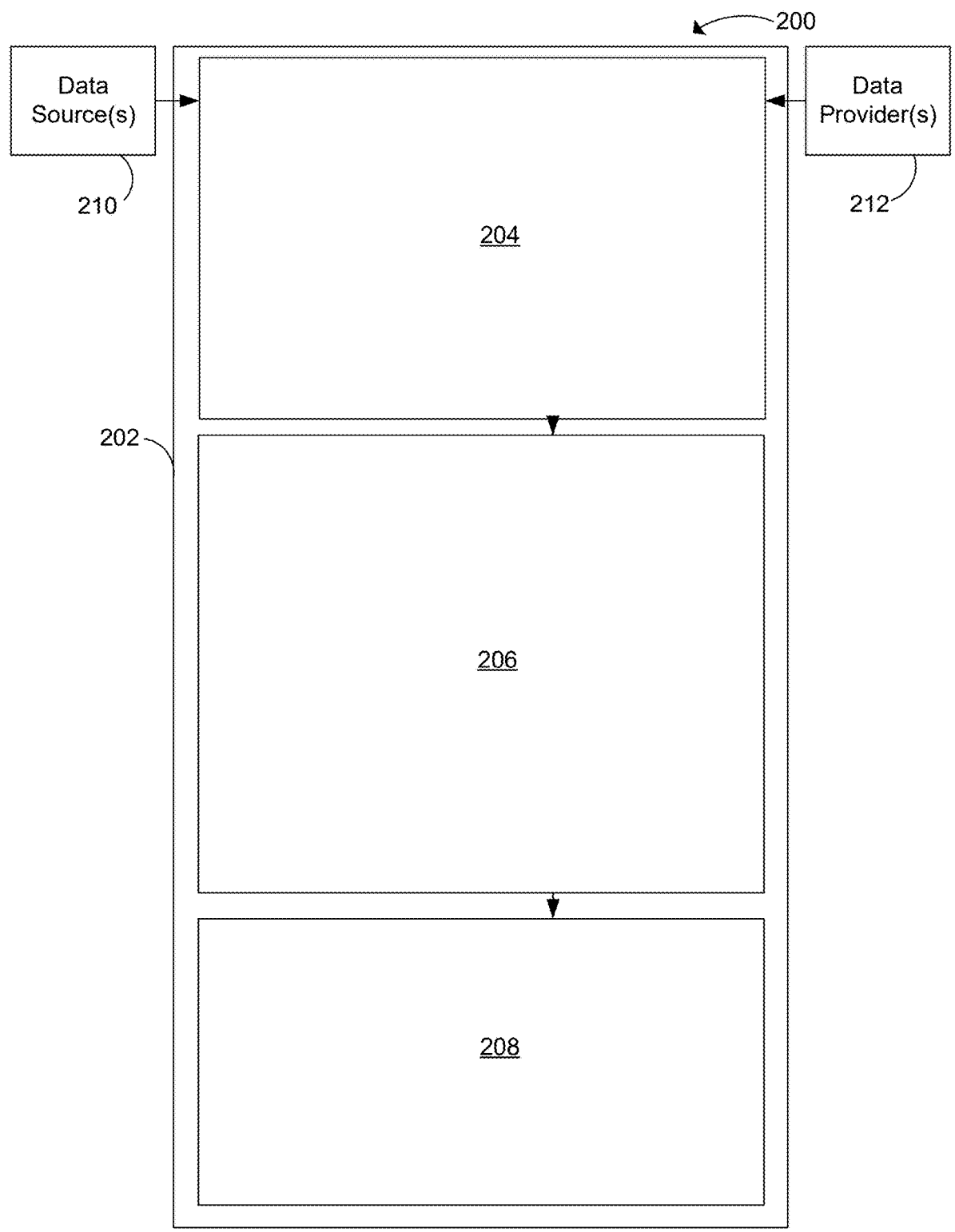
FIG. 2 shows a method diagram for determining and predicting vessel rendezvous in accordance with one or more embodiments.

Referring next to FIG. 2, there is shown a method 200 for determining vessel rendezvous and predicting future rendezvous in accordance with one or more embodiments. Method 200 may be a high-level method that is described in further detail herein. Method 200 may be performed by server 202, having data ingestion 204, vessel data processing 206, and vessel rendezvous analysis 208.

One or more data sources 210 may be provided as input to the assessment server 202. These one or more data sources may include one or more vessel tracking data providers, one or more vessel information providers, one or more mapping providers, one or more regional boundary providers, etc.

The data from the one or more data sources 210 may be received by a data ingestion 204. The data ingestion process is described in further detail in FIG. 3. The ingested data is received by vessel data processing 206, which is described in further detail in FIG. 4. The processed data is received by vessel rendezvous analysis 208, which is described in more detail in FIG. 5.

One or more data providers 212 may be provided as input to the assessment server 202, and may include satellite radio-frequency data providers, optical satellite image data providers, and radar satellite image data providers.

Figure 3:
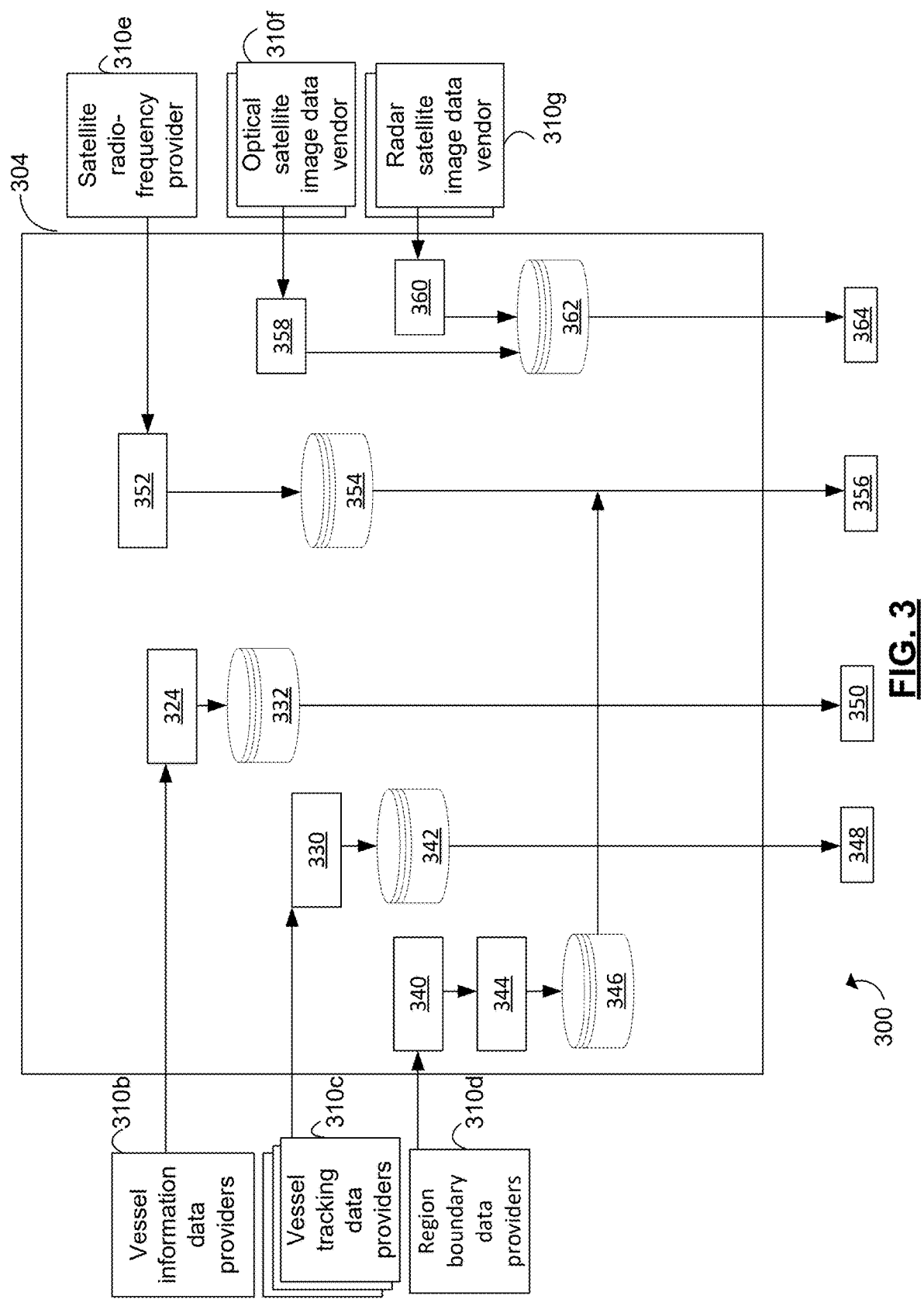
FIG. 3 shows a method diagram for ingesting data in accordance with one or more embodiments.

The data from the one or more data providers 212 may be ingested as described in FIG. 3. The ingested data is received by vessel data processing 206, which is described in further detail in FIG. 4. The processed data is received by vessel rendezvous analysis 208, which is described in more detail in FIG. 5.

FIG. 3 shows a data ingestion method 300 provided by assessment server 304 in accordance with one or more embodiments. The data ingestion method 300 may receive data from one or more data sources, one or more vessel information data providers 310b, one or more vessel tracking data providers 310c, and one or more region boundary data providers 310d. The data ingestion method 300 may receive data from one or more satellite providers (see e.g. 120 in FIG. 1), including a satellite radio-frequency provider 310e, an optical satellite image data vendor 310f, and a radar satellite image data vendor 310g. Data ingestion may occur periodically, i.e. daily, weekly, monthly, or may occur generally in real-time.

Data ingestion 300 may be performed to receive data into data lakes and may use a data streaming service such as Amazon® Web Services (AWS®) Firehose Kinesis®. Data may be ingested in near real-time or using a periodic polling process.

Vessel information data is received from the one or more vessel information data providers 310b at vessel data ingestion 324. The vessel information data providers may be a database such as the National Maritime Information Database (NM ID) from the Canadian Government, the Information Handling Services (IHS) vessel database, the Spectrum Direct Database provided by Industry Canada/ITU. The vessel information data may include vessel name information, vessel crew information (including but not limited to, changes in vessel crew manifests, crew member nationality, etc.), vessel general classification information, vessel individual classification information (including classification history), a vessel station group MMSI, a vessel gross tonnage, vessel passenger capacity information, vessel length, vessel MMSI number, vessel registration information including applicant information of the vessel registration, vessel ownership information (for example, the corporation of legal entity e.g. Groenewald & Germishuys CC, Tangming Co Ltd), etc. The vessel information data, once processed by vessel data ingestion 324, may be stored in vessel database 332. The vessel database 332 may be stored at database 110 (see FIG. 1). The vessel database 332 may provide vessel data 350 to the vessel data processor.

Vessel tracking data is received from the one or more vessel tracking data providers 310c for vessel tracking data ingestion 330. This may include satellite-based or terrestrial-based tracking data.

In an exemplary embodiment, AIS data is received from the one or more AIS data providers 310c at AIS data ingestion 330. As described above, the AIS data may include Satellite AIS data (SAIS) and Terrestrial AIS data (TAIS).

The AIS data may be stored as point data, corresponding to the periodic transmissions of an AIS equipped vessel.

Vessel tracking data may be processed by vessel tracking data ingestion 330 and may be decoded from a raw format. The processed vessel tracking data may be stored in the AIS database 342.

In an exemplary embodiment, AIS data may be processed by AIS data ingestion 330 and may be decoded from the AIS National Marine Electronics Association (NMEA) 0183 or NMEA 2000 data formats. The decoding may further include decoding AIS sentences such as AIVDM sentences. Decoding of AIS messages may further include decoding based on ITU Recommendation M.1371 (including revisions), IALA Technical Clarifications on Recommendation ITU-R M.1371-1, and IEC-PAS 61162-100. An AIVDM sentence may describe the vessel position and vessel information of a vessel, or other pieces of information as described in the AIS specifications. The processed AIS data may be stored in the AIS database 342.

The vessel tracking data ingestion 330 may determine variables from each vessel tracking data point or segment of vessel tracking data for a vessel.

The vessel tracking data ingestion 330 may further match vessels identified in the vessel tracking data with vessels found in the vessel database 332 or vessel incident database 326.

The vessel tracking database 342 may be stored at database 110 (see FIG. 1). The vessel tracking data from vessel tracking database 342 may be provided with the region boundary data from region boundary database 346 as vessel tracking data and boundary data 348 to the vessel processing (see FIG. 4) and the risk analysis engine (see FIG. 5).

Regional boundary data is received from the one or more region boundary data providers 310d at region boundary data ingestion 340. The region boundary data ingestion 340 may involve pre-processing of the region boundary data. Region boundary data curation 344 may be performed automatically, or manually, in order to connect disparate region boundaries in the region boundary data. The region boundary data may include a plurality of connected points, where each point has latitude and longitude data. The points may further be connected using the geometric location of ports, marine regions, and locations of Exclusive Economic Zones (EEZ). The region boundaries may be encoded in a shapefile. A shapefile may be a simple, nontopological format for storing the geometric location and attribute information of geographic features. Geographic features in a shapefile may be represented by points, lines, or polygons (areas).

Marine regions and EEZs may be provided as shapefiles. The marine region and EEZ shapefiles may be, for example, those produced by Flander Marine Institute which maintains a database of international borders in open waters. At 344, the shapefiles may be altered or curated. For example, an EEZ may be altered further to improve data processing times by reducing the size of the shapefile. The curation 344 may be performed by generating a one-way buffer in land for the EEZ. This may simplify the geometry around the coastline and allow joining of vessel tracking messages that may be at the land-sea boundary. The buffering of only 1 side may prevent an increasing of the extent of a countries EEZ.

The port shapefiles may be determined using the World Port Index ports. The ports may be converted into points, and then buffered to generate port zone shapefiles.

After the regional boundary data curation 344 is complete, the curated regional boundary data may be stored in region boundary database 346. The region boundary database 346 may be provided by database 110 (see FIG. 1). The region boundary database 346 may provide the curated region boundary data 348 to the vessel data processor.

Radio-frequency data may be received from one or more radio-frequency (RF) providers 310e and ingested at radio-frequency ingestion 352 and stored in RF vessel database 354. The RF data may be ingested from a 3rd party provider, such as Kleos and Unseenlabs. The data provider may provide access to a data connector using authentication credentials, such as a login name and password, and/or an encryption key. The RF data may be ingested 352 through API calls (e.g., API commands) to the RF data provider 310e. The raw data may be in comma separated value (CSV) format or another data interchange format as known. The RF data ingestion 352 may ingest data containing the timestamp of collection, the position (latitude and longitude) of the RF data capture, the frequency of the RF data capture, pulse repetition frequency, the pulse repetition duration and the accuracy of the position of the capture (see e.g. the example RF data shown in FIG. 16).

Figure 4:
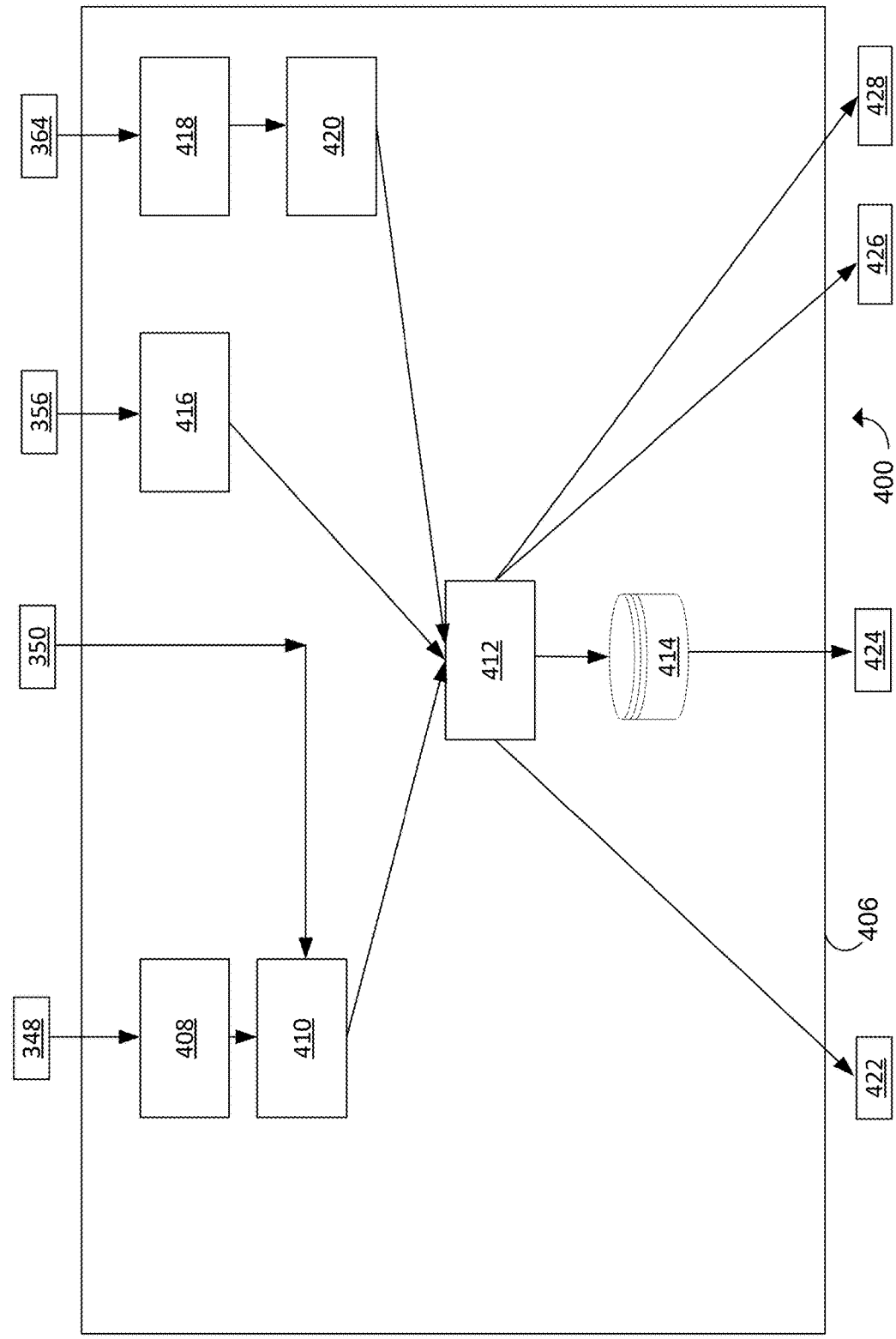
FIG. 4 shows a method diagram for processing vessel data in accordance with one or more embodiments.

The RF data 354 and the region boundary data 346 may be provided at 356 to the vessel data processor (see FIG. 4).

Optical satellite image data ingestion 358 occurs as optical satellite image data is received from an optical satellite image data provider 310f and ingested and stored in satellite image database 362. There may be more than one optical image data provider.

Optical satellite image providers 310f may include the Sentinel-2 mission or PlanetScope or the like.

Sentinel-2 is a mission led by the European Space Agency (ESA) with participation from industry and academic partners. It may include a constellation of two identical satellites launched and carefully positioned to offer the frequent revisit time for data collection. Both satellites may carry a multispectral sensor collecting images at a spatial resolution that may range from 10 m to 60 m, enabling the use of the data for monitoring of the natural and built environment. The Sentinel-2 images may include image data including 13 multispectral bands covering the visible, near infrared, and infrared spectrum. The spatial resolution may vary depending on the bands, including having four bands at 10 m in the visible spectrum, six bands at 20 m and three at 60 m in the infrared segment. The spectral resolution, also known as bit depth, may be 12 bits for all bands allowing digital values in the range [0, 4095].

PlanetScope is a commercial data product sold by Planet. The raw images may be collected by a constellation of more than 130 micro satellites and in combination can observe the entire Earth's surface every day. The PlanetScope constellation may offer worldwide coverage and a daily revisit time, producing images at a resolution of approximately 3.7 meters. PlanetScope raw images may be recorded as continuous strips of data called scenes which may include only three bands in the visible spectrum (RGB) or four with the addition of a near-infrared band.

At radar satellite data ingestion 360, radar satellite images are received from a radar satellite image provider 310g and ingested and stored in satellite image database 362.

Radar satellite image providers 310g may include the RADARSAT Constellation Mission (RCM) or Sentinel-1 or the like.

The RADARSAT Constellation Mission (RCM) is the latest generation of Earth observation satellites developed by the Government of Canada. It may include multiple imaging modes which allow the collection of data at a spatial resolution ranging from 1 m to 100 m depending on the beam mode, angle of incidence, number of looks, and polarization.

The Sentinel-1 mission is part of the Copernicus program, a joint initiative from the European Space Agency (ESA) and the European Commission (EC) to provide quality Earth observation data products. The Sentinel-1 mission may collect data in the C-band using the Synthetic Aperture Radar (SAR) technology and therefore can see through clouds and may not be affected by weather conditions such as rain, fog, or falling snow. With four imaging modes, the mission offers data products with a spatial resolution that may range from ~5 m to ~100 m and may enable applications that require fine detail on small zones or quick coverage over large areas. The Sentinel-1 mission may also offer horizontal and vertical signal polarizations to allow for complex applications that look at the backscattering effects produced by specific types of land cover.

The optical data ingestion 358 and radar data ingestion 360 may be designed to use satellite images coming from multiple sensors owned and operated by private or government organizations. In some cases, such as the satellite images collected by the Sentinel-1 and Sentinel-2 sensors, the data may be accessed by connecting to a shared folder in a cloud account owned by the data provider, and downloading relevant image and metadata files. In other cases, such as with the satellite images provided by Planet Labs Inc., data may be accessed through API calls that make use of API commands and credentials.

The vessel satellite image database 362 may be an object storage service (also referred to as a bucket), or a database system. The vessel satellite image database 362 may be locally hosted, or may be provided by a cloud provider such as Amazon AWS.

Figure 20:
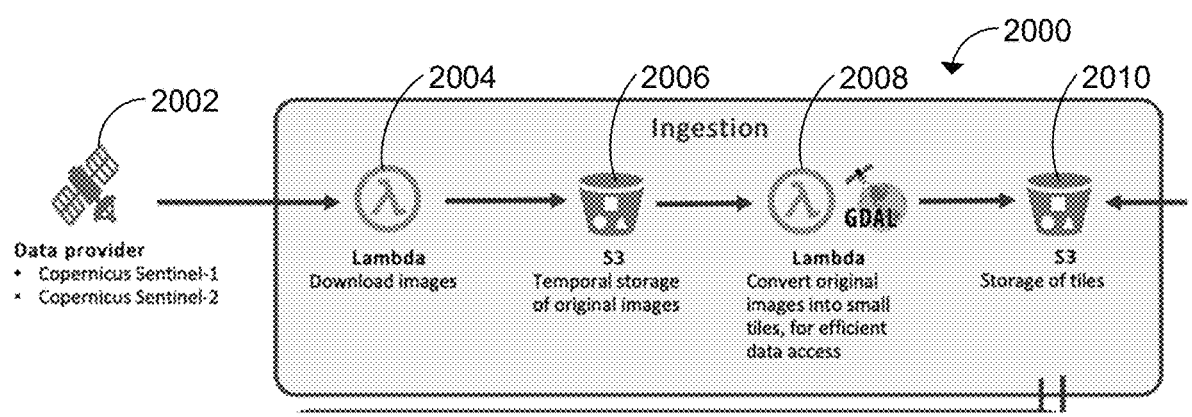
FIG. 20 shows a method of satellite data ingestion in accordance with one or more embodiments.
Figure 21:
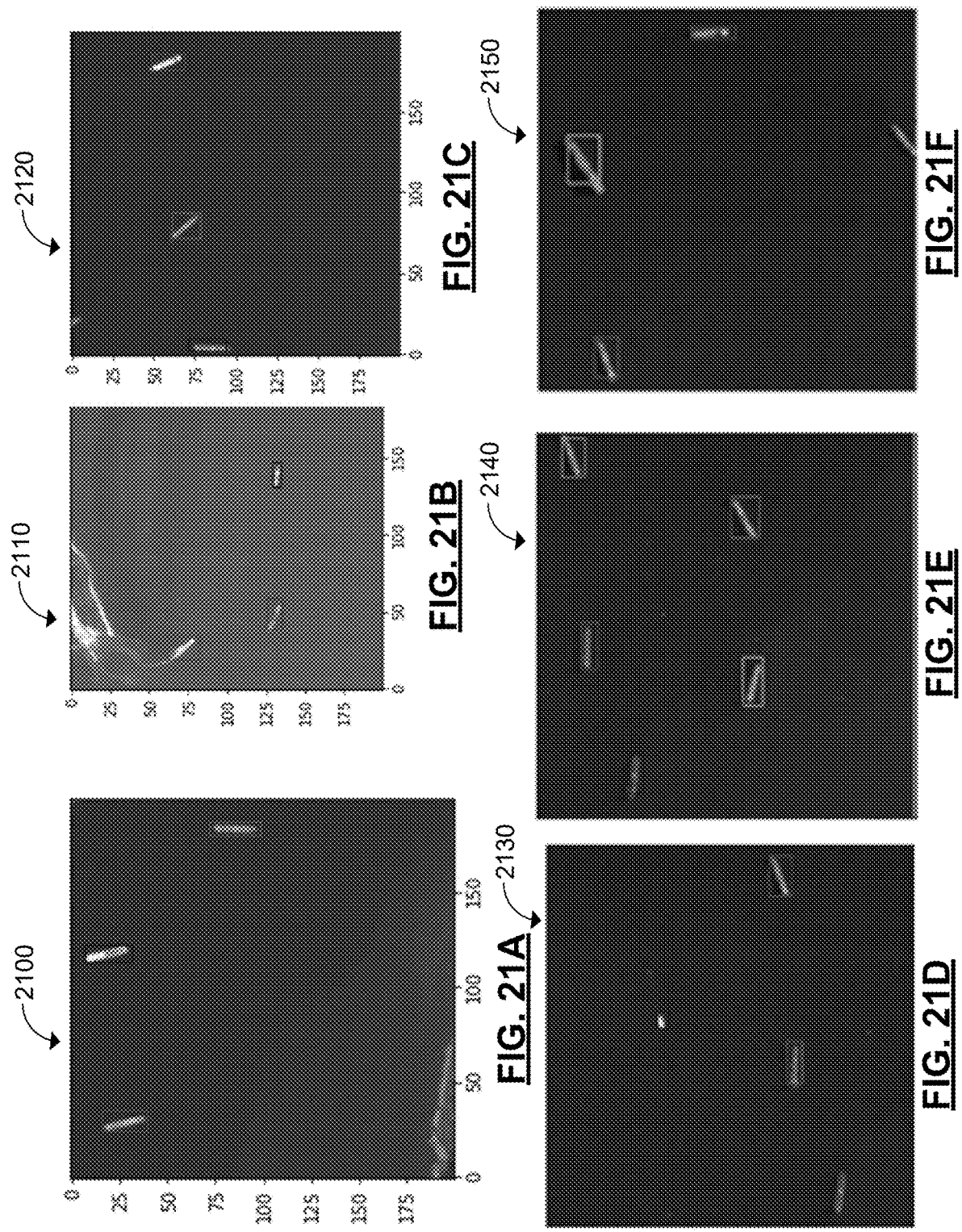
FIG. 21A-FIG. 21F show identified vessel positions in satellite image data from a satellite image provider, in accordance with one or more embodiments.

Referring next to FIGS. 3 and 20 together, there is shown a method of satellite data ingestion 2000 in accordance with one or more embodiments. The method of satellite data ingestion may be the optical satellite data ingestion 358 or the radar satellite data ingestion 360, or both.

At 2002, satellite data is captured by a satellite of a satellite data provider.

At 2004, satellite images and associated metadata are received from a satellite data provider 2002 at a first ingestion step 2004, where image data and metadata are downloaded from the data provider 2002.

At 2006, the satellite images and associated metadata are stored using a storage system. The storage system may be local to the assessment service, or may be a cloud-based service such as Amazon S3. The satellite images and associated metadata may further be stored in a database.

At 2008, the satellite images may be processed using data preparation steps. There may be multiple data preparation steps that may be applied to the satellite images so that they have the proper cartographic projection, resolution (spatial, multispectral, radiometric), alignment with a reference frame, overlap with areas of interest, contrast enhancement, increase or decrease in size in pixels, among other image processing steps. Such data preparation steps 2008 as part of ingestion may vary in order and relevance depending on the specific characteristics of the satellite images. The format of the satellite image data received from satellite provider 2002 may include but is not limited to the following: Tag Image File Format (TIFF), Geographic Tagged Image File Format (GeoTIFF), Cloud Optimized Geotiff (COG), and Portable Network Graphics (PNG) format.

At 2010, the processed satellite image data and associated metadata may be stored for later retrieval.

Referring next to FIG. 4, there is shown a method 400 for processing vessel data in accordance with one or more embodiments. The method 400 may run at a vessel data processor 406 and may receive vessel tracking data and boundary data 348, vessel data 350, vessel radiofrequency data 356, and vessel satellite image data 364 from the data ingestion.

Figure 11:
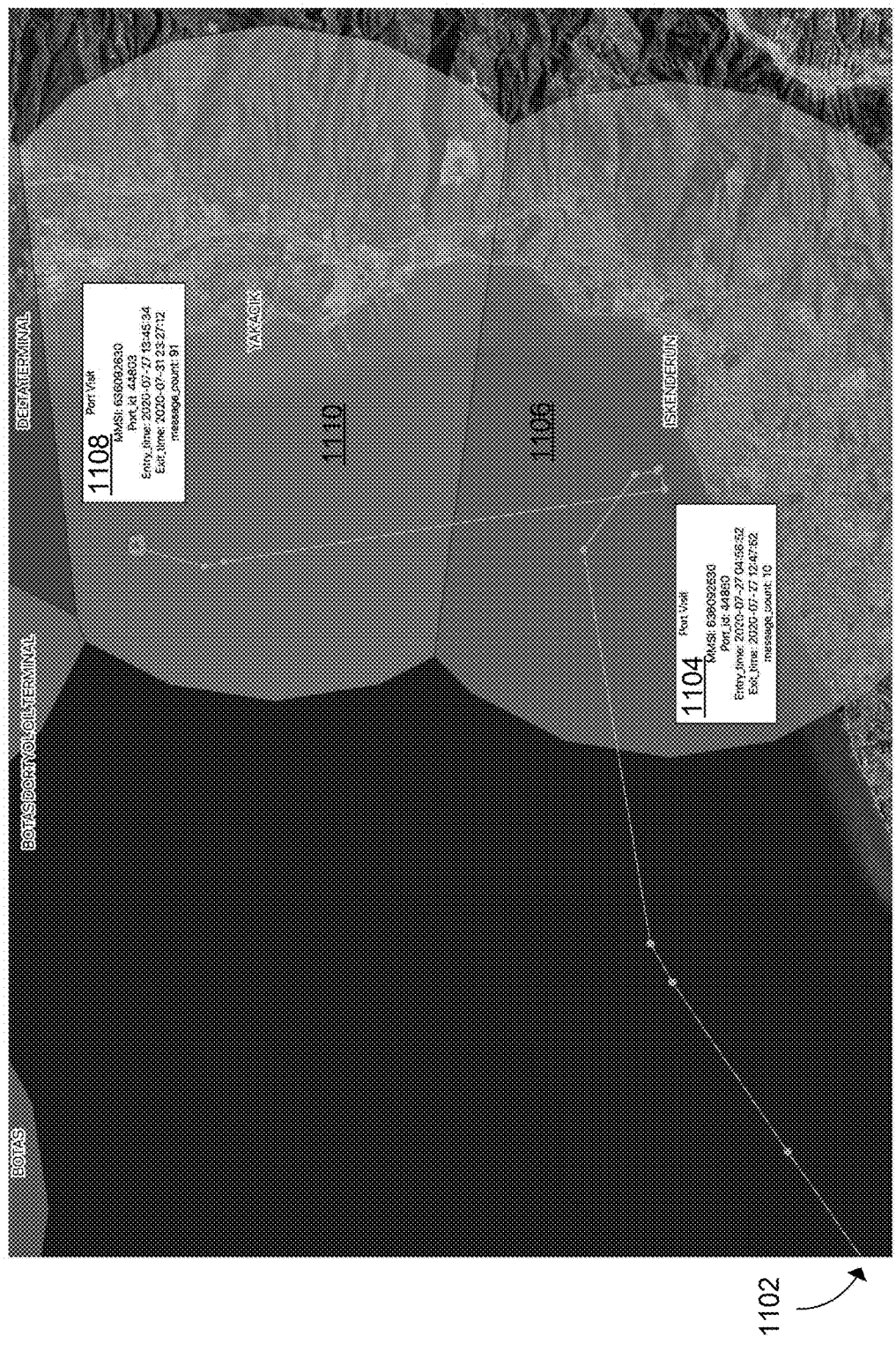
FIG. 11 shows a map diagram for port visit identification in accordance with one or more embodiments.

At 408, the vessel tracking data is enhanced with boundary data 348. The join operator between the shapefiles and vessel tracking positions may output the corresponding location identification on which each vessel tracking message is being reported in. This information can then be used by later modules for selecting region specific analysis. FIG. 11 shows an example of the identified regions and ports.

The vessel data enhancement may be performed using the following method.

First, a shapefile (nontopological format for storing geometric location and attribute information of geographic features) is received including geometric location of ports, marine regions, and Exclusive Economic Zones (EEZ). Geographic features in a shapefile can be represented by points, lines, or polygons (areas).

Next, a one-way buffer is determined inland for the EEZ. The buffer may simplify the geometry around the coastline as well as allowing joining of vessel tracking messages that may be on the land boundary.

Next, a plurality of port points from a plurality of port shapefiles are determined and buffered.

Next, one or more position points are received and joined with the buffer.

At 410, one or more vessels may be identified in the vessel tracking data and vessel data. The vessels may be identified by determining a unique vessel signature and assigning a corresponding unique vessel identifier based on the unique vessel signature. The unique vessel identifier may be an internal identifier of the vessel assessment system, and each segment may have a unique vessel identifier associated with it. Alternatively, an MMSI number may be determined, or a vessel name may be detected or matched, or by another means of identification as is known. The identification may include assigning a unique vessel identifier to data points or segments, creating a unique vessel identifier to assign to the data points or segments, or updating an existing unique vessel identifier for the data points of segments.

At 416, vessel RF data 356 is enhanced based on regional boundary data and marine radar band information (for example, S band and X band as described herein).

Figures 16, 17:
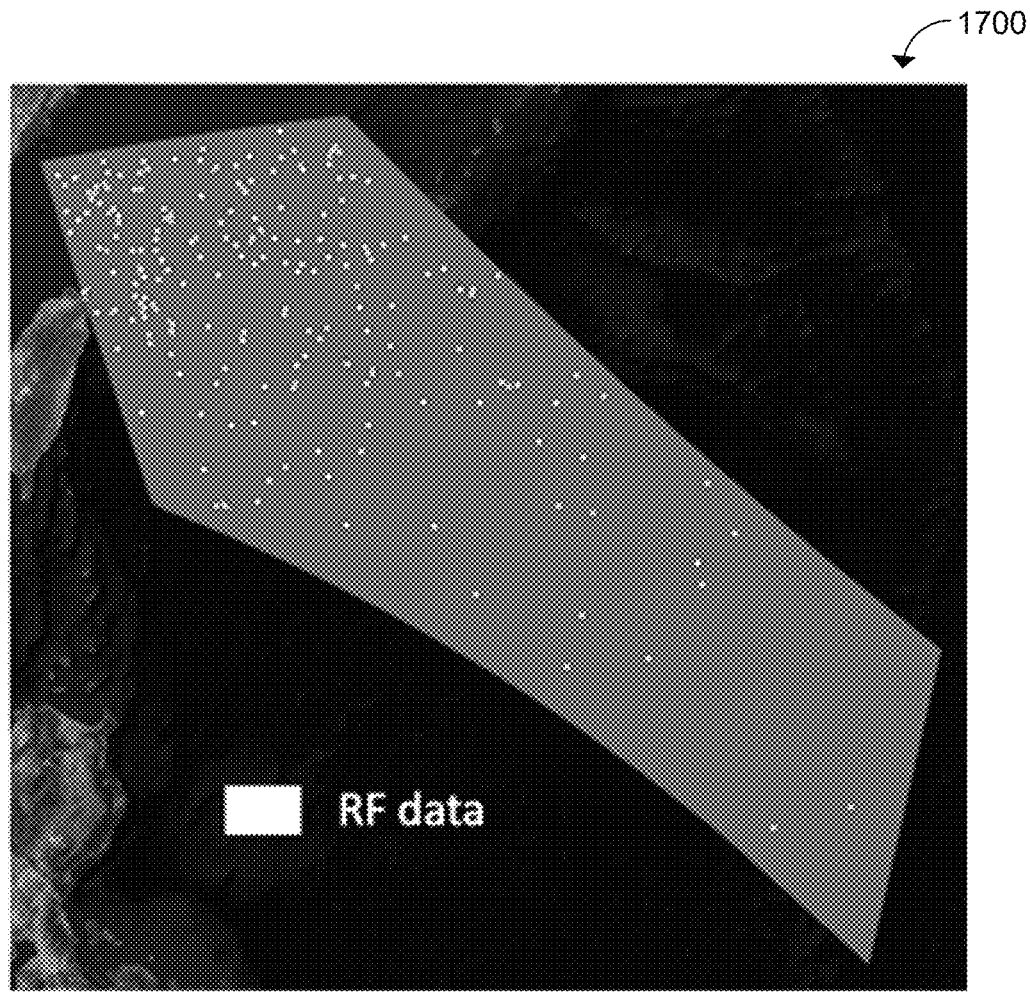
FIG. 16 shows an example of radio-frequency (RF) data received from a radio-frequency provider in accordance with one or more embodiments.
FIG. 17 shows a map of another example of radio-frequency (RF) dataset from a radio-frequency provider in accordance with one or more embodiments.

This may include enhancing RF data points 356 in an analogous way to the enhancement of vessel tracking data in order to incorporate region boundaries as described herein. An example RF data capture in a corresponding regional boundary is shown in FIG. 17, having associated radar bands identified in the datapoints FIG. 18. The example RF data capture in FIG. 17 is shown in FIG. 19 having RF band enhancement completed, and datapoints on the map associated with S band and X band are shown. The vessel RF data enhancement may be performed as follows.

The vessel RF data 356 is enhanced with boundary data 348. The join operator between the shapefiles and vessel RF data positions may output the corresponding location identification on which each RF data position is being reported in. This information can then be used by later modules for selecting region specific analysis. FIG. 11 shows an example of the identified regions and ports.

The vessel data enhancement for RF data 356 may be performed using the following method.

First, a shapefile (nontopological format for storing geometric location and attribute information of geographic features) is received including geometric location of ports, marine regions, and Exclusive Economic Zones (EEZ). Geographic features in a shapefile can be represented by points, lines, or polygons (areas).

Next, a one-way buffer is determined inland for the EEZ. The buffer may simplify the geometry around the coastline as well as allowing joining of vessel RF data messages that may be on the land boundary.

Next, a plurality of port points from a plurality of port shapefiles are determined and buffered.

Next, one or more position points (i.e. the vessel RF data 356) are received and joined with the buffer. Thus, the vessel RF data is enhanced using the region boundary data.

The associated RF band enhancement is performed, including joining data points with RF band type. The RF band type may play a role because it helps subsequently at the multi-source trajectory construction 412. The range of the frequency of the RF collection may determine the size of the instrument the vessel used, which may approximate the size of the vessel. Thus, the vessel RF data is enhanced using the associated RF band data.

Figure 18:
FIG. 18 shows an enhanced RF dataset from FIG. 16, in accordance with one or more embodiments.
Figure 19:
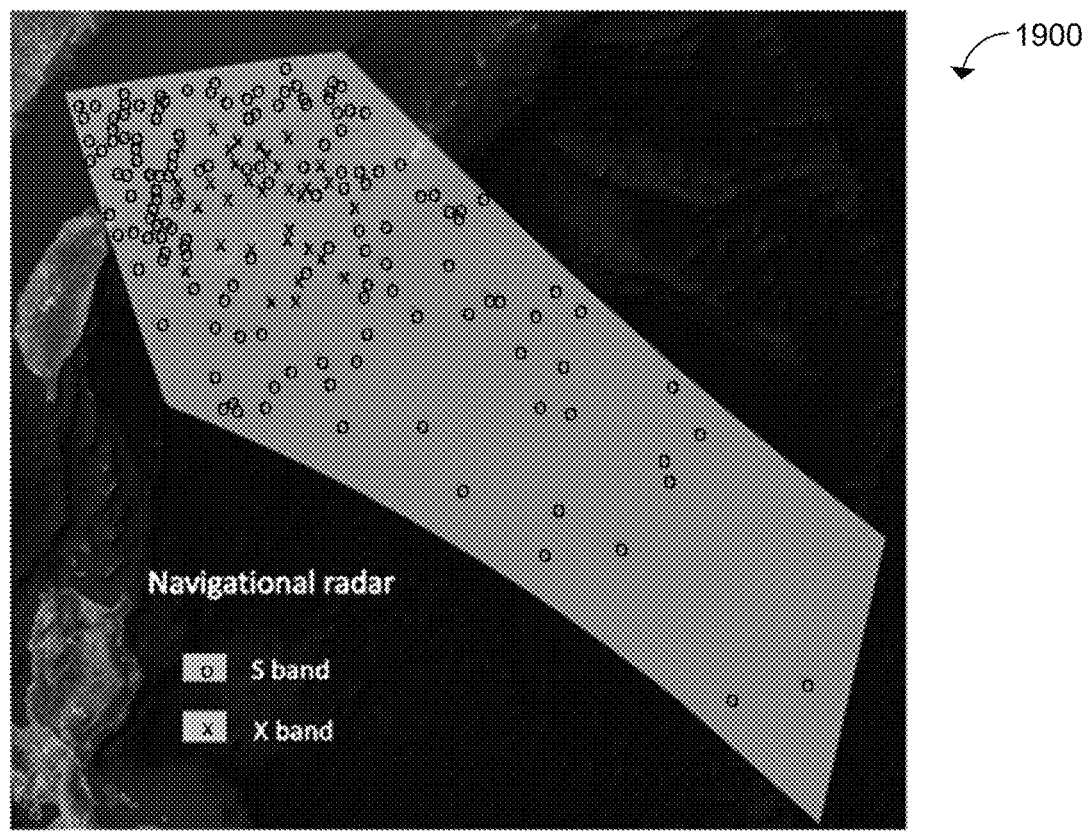
FIG. 19 shows another map of the radio-frequency (RF) dataset of FIG. 17 from a radio-frequency provider in accordance with one or more embodiments.

An example of the RF data in FIG. 16 that has been enhanced is shown in FIG. 18 including Band, Marine Region ID, Exclusive Economic Zone identifiers, and Port Identifiers.

At 418, an automated analysis of the received satellite images 364 is performed to determine the location and type of entities of interest within the satellite data 364. This analysis is subdivided in two tasks as commonly known in the computer vision literature: object detection and classification. In this case the objects detected in the images correspond to relevant maritime entities as defined herein. One of the most important entities to consider are vessels, which may be of multiple types such as container, tanker, bulk carriers, etc.

To accomplish automated object detection and classification, Deep Learning methods (DL) adapted specifically to the characteristics of the image data and the computer vision tasks may be used. These advanced models may simultaneously detect an object of interest and classify the type of such object within several predefined maritime entities relevant for the project. Since satellite images from several sources are available, and the characteristics of each data provider are different, it may be necessary to have multiple models to accommodate the specific sensing modality (e.g., optical, RADAR) and the spatial, temporal, and spectral resolution.

The Deep Learning models may be created beginning with the preparation of a training dataset in the form of small tiles (for example, ~300 by 300 pixels) that originate from large satellite images (>10,000 by >10,000 pixels). These tiles may be manually labeled by human reviewers who draw a bounding box enclosing each object of interest (e.g. ships). In other words, for each image tile a label file may be created which represents the ground truth location and vessel type of maritime entities appearing on the image. Then a Deep Learning model may be trained with these pairs of image and label files. Examples of identified vessel positions in satellite images are shown including bounding boxes in FIGS. 21A to 21F. During the training process the model may receive many data samples as input and may learn to automatically detect and classify the objects of interest.

The Deep Learning models may include those described in research literature such as Single Shot Multibox Detector (SSD), Faster-RCNN, RetinaNet, MobileNet, amongst others. These models may be generated by receiving images as input and learning useful features such as corners, edges, variations in color or texture, and may progressively extract more contact representations across layers of neurons until reaching their final output. Such output may be a matrix that includes but is not limited to the following characteristics of the detected ships: location, size, orientation, color, type (e.g. container, tanker, etc.). During training, a backpropagation algorithm along with optimization methods may be used to minimize an error function. Such optimization methods may include but are not limited to: Adam, AdaGrad, RMSProp, and Stochastic Gradient Descent (SGD).

At 420, vessel satellite image data 364 is enhanced based on regional boundary data. This may include enhancing satellite image data points (including those recognized at vessel identification 418) in an analogous way to the enhancement of vessel tracking data in order to incorporate region boundaries as described herein. The vessel satellite image data enhancement may be performed as follows.

The identified vessel locations in the satellite image data are enhanced with boundary data 348. The join operator between the shapefiles and identified vessel satellite image positions may output the corresponding location identification on which each vessel identified in the satellite image data is being reported in. This information can then be used by later modules for selecting region specific analysis. FIG. 11 shows an example of the identified regions and ports.

The vessel data enhancement for vessel satellite position data may be performed using the following method.

First, a shapefile (nontopological format for storing geometric location and attribute information of geographic features) is received including geometric location of ports, marine regions, and Exclusive Economic Zones (EEZ). Geographic features in a shapefile can be represented by points, lines, or polygons (areas).

Next, a one-way buffer is determined inland for the EEZ. The buffer may simplify the geometry around the coastline as well as allowing joining of vessel satellite position data that may be on the land boundary.

Next, a plurality of port points from a plurality of port shapefiles are determined and buffered.

Next, one or more vessel satellite position points are received and joined with the buffer. Thus, the vessel satellite position data is enhanced using the region boundary data.

At 412, multi-source trajectory construction is performed in order to construct a vessel trajectory. The multi-source trajectory construction 412 may include conducting trajectory-based spatiotemporal entity linking to match the same moving object in different datasets based on their movement traces. The entity linking may be performed by solving the high-dimensional object linking problem by considering the enhanced AIS segments, the enhanced RF segments, and the enhanced satellite image detection points by using trajectory similarity metrics.

Trajectory-based spatiotemporal entity linking may be conducted to match the same moving object in different datasets (e.g. AIS, satellite imagery, and RF) based on their movement traces.

Figure 22:
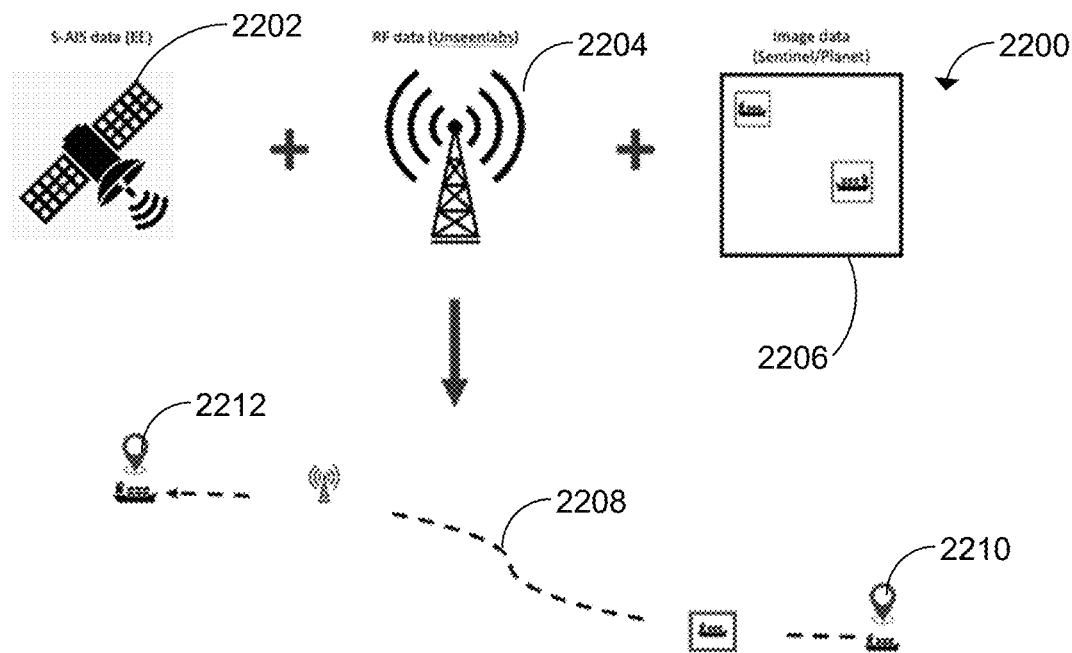
FIG. 22 shows an example of spatiotemporal entity linking in accordance with one or more embodiments.
Figure 23:
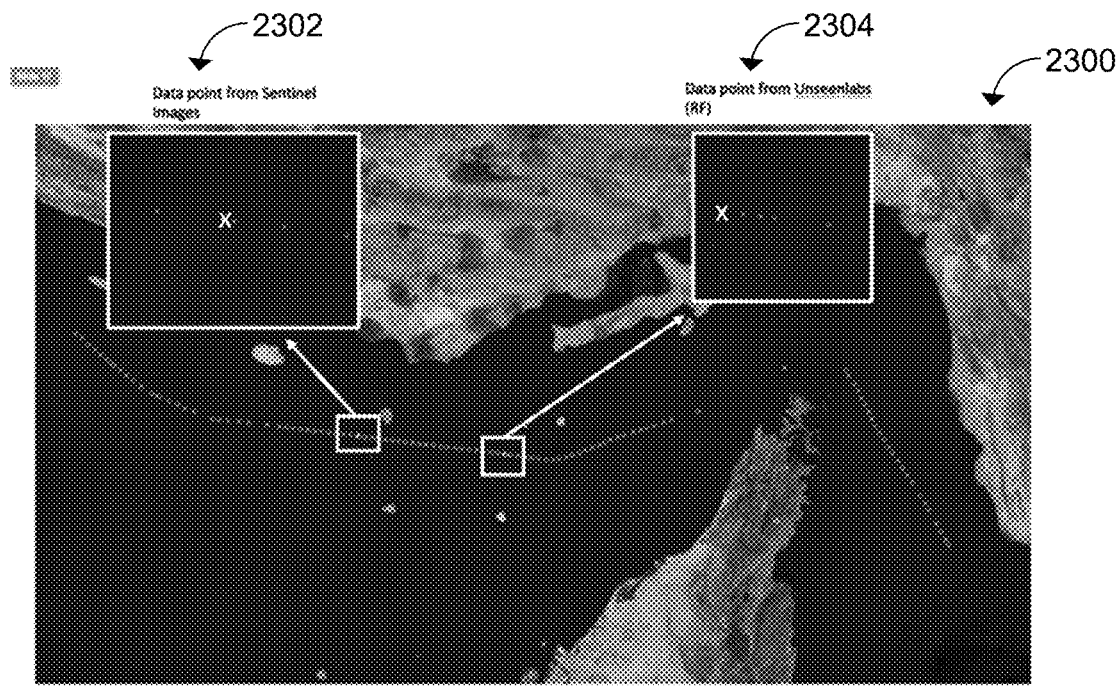
FIG. 23 shows an example of trajectory linking using radio-frequency (RF) vessel data and optical satellite vessel data, in accordance with one or more embodiments.

Referring to FIGS. 22 and 23 together, there is shown an example of spatiotemporal entity linking 2200 in accordance with one or more embodiments, and an example of trajectory linking 2300 using radio-frequency (RF) vessel data and optical satellite vessel data.

An entity such as a vessel may be present in multiple different datasets, including vessel tracking data 2202, vessel RF data 2204, and vessel satellite image data 2206.

Spatiotemporal entity linking may provide for the combination of multiple types of location data into a single trajectory 1208 between a vessel origin 2210 and a vessel destination 2212.

Trajectory reconstruction methods may be used in order to solve this high-dimensional object linking problem by considering the enhanced vessel tracking segments, the enhanced vessel RF segments, and the enhanced satellite image detection points.

A vessel tracking trajectory may be a sequence of vessel tracking points that are chronologically ordered. Each point p in the trajectory may be represented as (vessel identifier, latitude, longitude, timestamp). Vessel RF and vessel satellite imagery detections may be represented by (latitude, longitude, timestamp). It is noted that the vessel identifier may be lacking from the vessel RF data and vessel satellite imagery detections. The model may identify the vessel identifier for the vessel RF data and vessel satellite imagery point detections, and therefore to complete any gaps of the vessel tracking trajectory with the vessel RF data and vessel satellite imagery point detections.

At 2300, an example of trajectory linking using vessel RF data points and vessel satellite image position is shown. As shown, a data point 2302 from the vessel satellite image position is combined with a vessel RF data point 2304 in order to determine a vessel trajectory.

Returning to FIG. 4, at 412 a machine learning model may be used to determine a constructed vessel trajectory.

Figure 24:
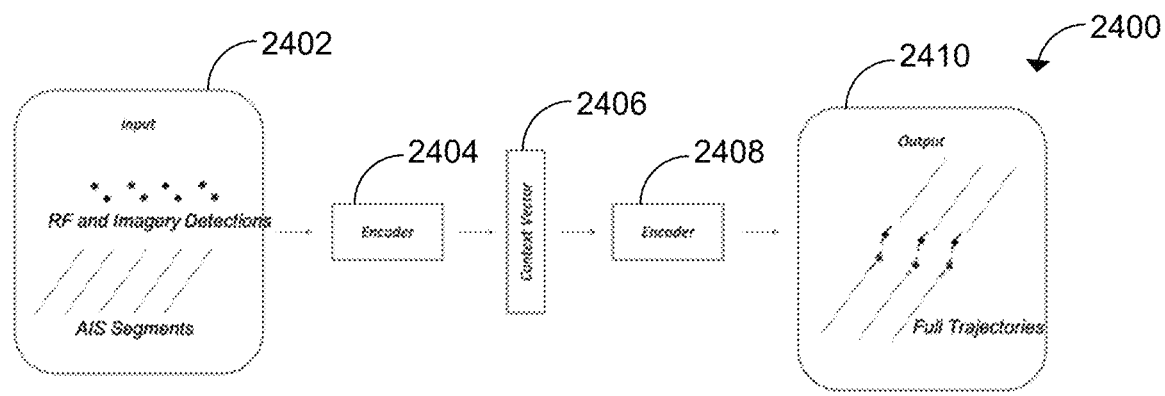
FIG. 24 shows an example machine learning model for constructing vessel trajectories, in accordance with one or more embodiments.

Referring to FIG. 24, there is shown an example machine learning model 2400 for constructing a vessel trajectory. The machine learning model may be based on deep learning-based encoder decoder architecture using a mix of Convolutional and LSTM layers. The encoder 2404 encodes the input sequence 2402 (e.g., the AIS, RF and Imagery points) into an internal low-dimension representation, for example, a fixed length context vector 2406. The decoder 2408 decodes the context vector and generates the output sequence 2410 (e.g., the full trajectories). The prediction model 2400 may be trained using the set of un-linked trajectory segments as input and completed and linked trajectories as output of the model. Once the model is trained, it may be used to predict which vessel RF and vessel satellite imagery detections belong to the existing vessel tracking (i.e. AIS) trajectories.

At 414, the constructed vessel trajectories may be stored in vessel trajectory database 414. The vessel trajectory database 414 may be the database 110 (see FIG. 1). At 424, the stored vessel trajectory data in the database 414 is provided to the vessel rendezvous model training processor. The vessel trajectory data may include vessel tracking data, vessel RF data, and vessel satellite image position data (from either or both of radar satellite images and optical satellite images).

The vessel trajectory data may be provided in real-time at 422 to the vessel rendezvous detection processor (see FIG. 5), and at 426/428 to the vessel rendezvous prediction processor.

Figure 5:
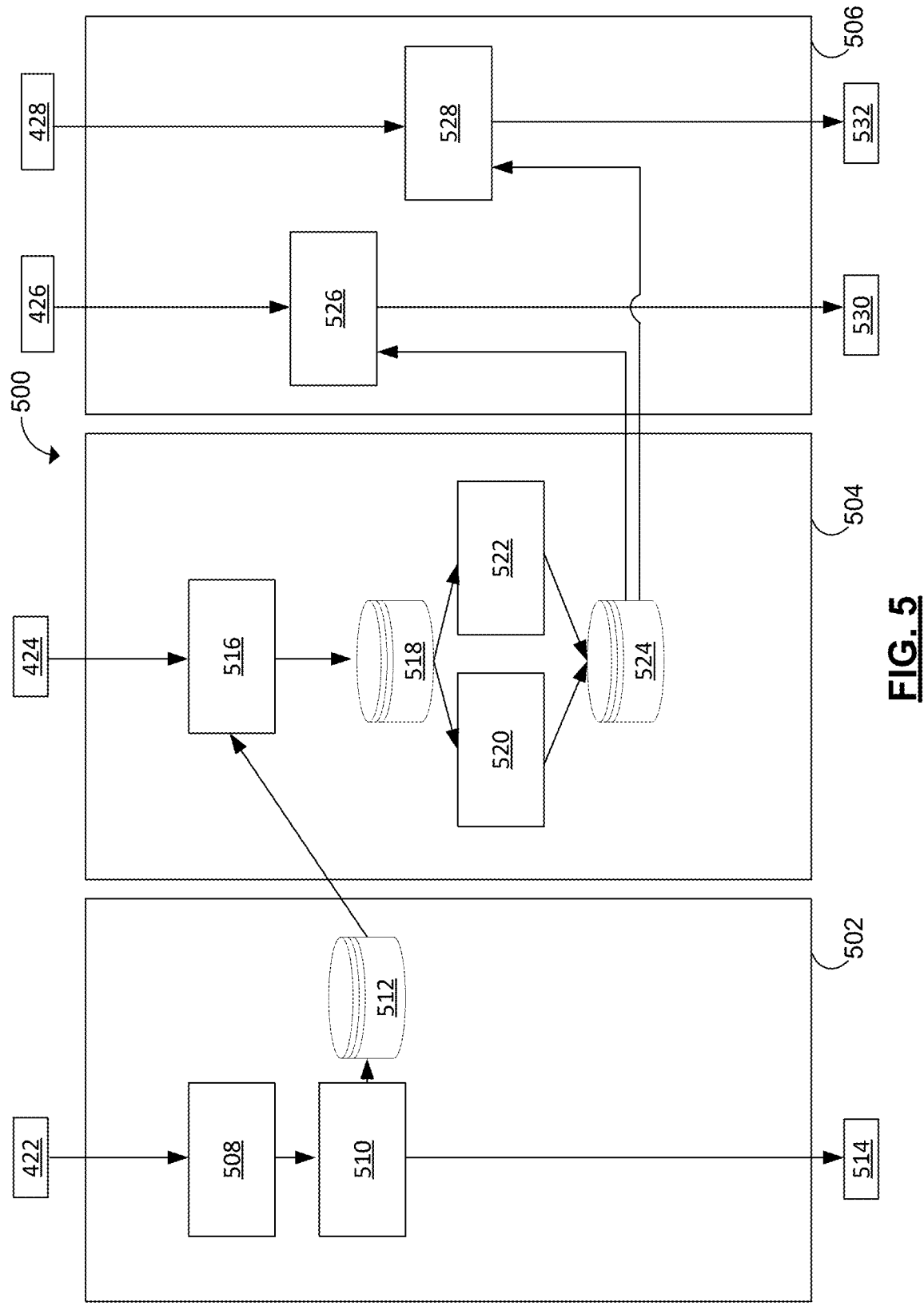
FIG. 5 shows a method diagram of detecting and predicting vessel rendezvous in accordance with one or more embodiments.

Referring next to FIG. 5, there is shown a method diagram 500 for detecting and predicting vessel rendezvous in accordance with one or more embodiments. Vessel rendezvous detection 502 may receive constructed vessel trajectory 422, and may include determining at least one unstable speed segment of a vessel trajectory 508, performing rendezvous detection 510, and storing at least one rendezvous in rendezvous history database 512. Vessel rendezvous model training 504 may receive vessel historical constructed trajectories 424 and vessel rendezvous history database 512, and may include labeling data preparation 516, labeled database 518, rendezvous prediction model training 520, rendezvous type classification model training 522, and rendezvous prediction and classification trained model 524. The vessel rendezvous prediction processing 506 may receive constructed vessel trajectories 426 and 428, and rendezvous prediction trained model 520 and rendezvous prediction classification trained model 522, and deploy the trained models into production in a virtual machine or computer resulting into rendezvous prediction type classification 526 and rendezvous prediction 528.

At 508, unstable speed segments may be detected from constructed vessel trajectories 422. The constructed vessel trajectories 422 may include one or more trajectory segments. The one or more trajectory segments having unstable speed may be identified. This may include identifying segments for a vessel underway at sea where the vessels speed falls outside of the average for the trip or is otherwise inconsistent with other segments.

At 510, vessel rendezvous' may be detected from constructed vessel trajectories 422. The rendezvous' may be detected based upon the unstable speed segments determined at 508, or may be detected based upon the proximity of a vessel during its trajectory with other vessels.

The identified vessel rendezvous from the one or more segments may be stored in a vessel rendezvous history database 512. The vessel rendezvous history database 512 may be provided by database 110 (see FIG. 1). The vessel rendezvous history in vessel rendezvous history database 512 may be associated with the unique vessel identifier.

The vessel rendezvous data in the vessel rendezvous history database 512 may include the identity of one or more vessels involved in the rendezvous, a location at sea where the rendezvous occurred, a maritime zone where the rendezvous occurred, a start time and an end time of the rendezvous. Further, the rendezvous data may also include information about services or goods transferred between the vessels involved with the rendezvous.

Figure 25:
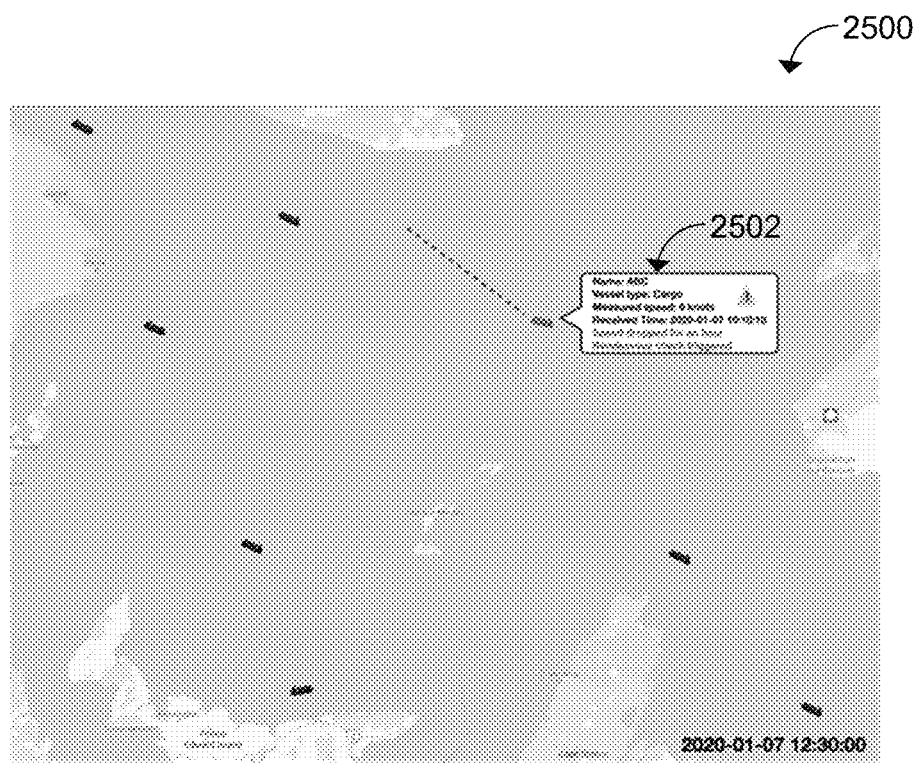
FIG. 25 shows an example of a rendezvous detection triggered based on unstable speed, in accordance with one or more embodiments.

Vessel rendezvous detection may be triggered when one or more segments of a vessel trajectory drop below a speed threshold (for example, see 2502 in FIG. 25 which shows a rendezvous detection triggered when a vessel's speed dropped for a trajectory segment).

Figure 26:
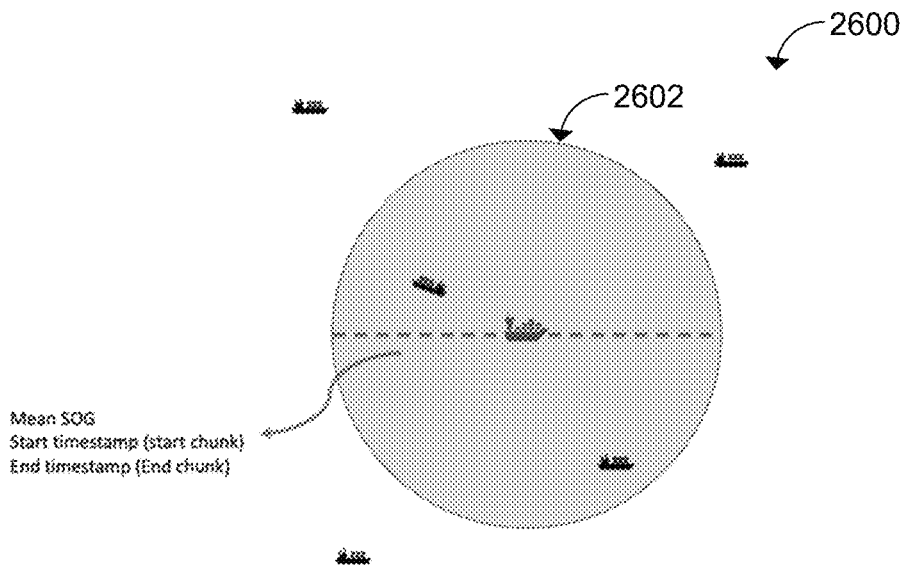
FIG. 26 shows an example of a rendezvous detection triggered based on vessel proximity, in accordance with one or more embodiments.

Vessel rendezvous detection may be triggered when a vessel enters into proximity with one or more other vessels (see e.g. proximity threshold 2602 in FIG. 26 which shows a rendezvous detection triggered based on vessel proximity).

Figure 8:
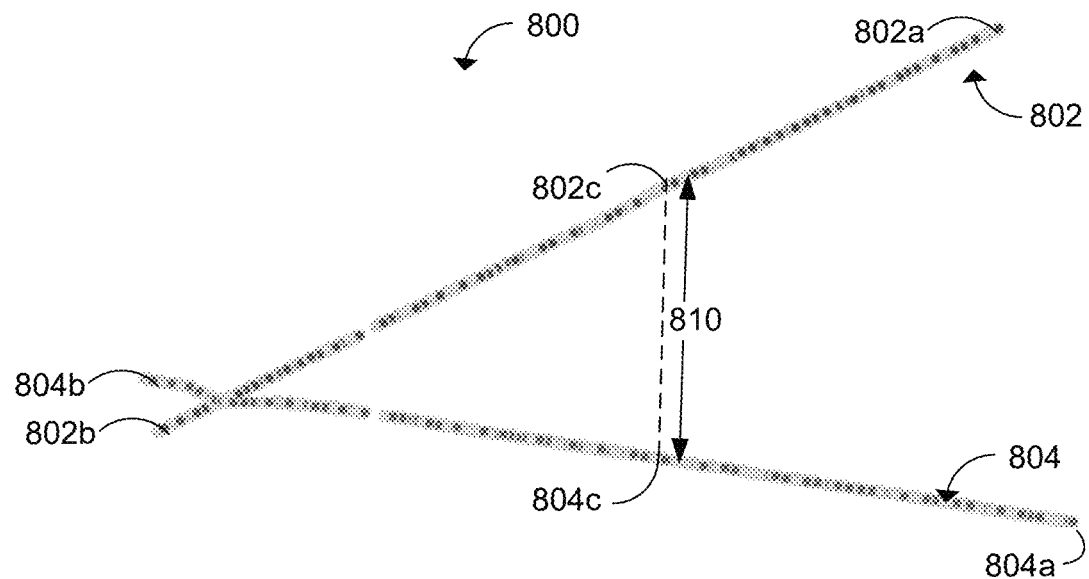
FIG. 8 shows a map diagram for two vessels engaged in a rendezvous in accordance with one or more embodiments.
Figure 9:
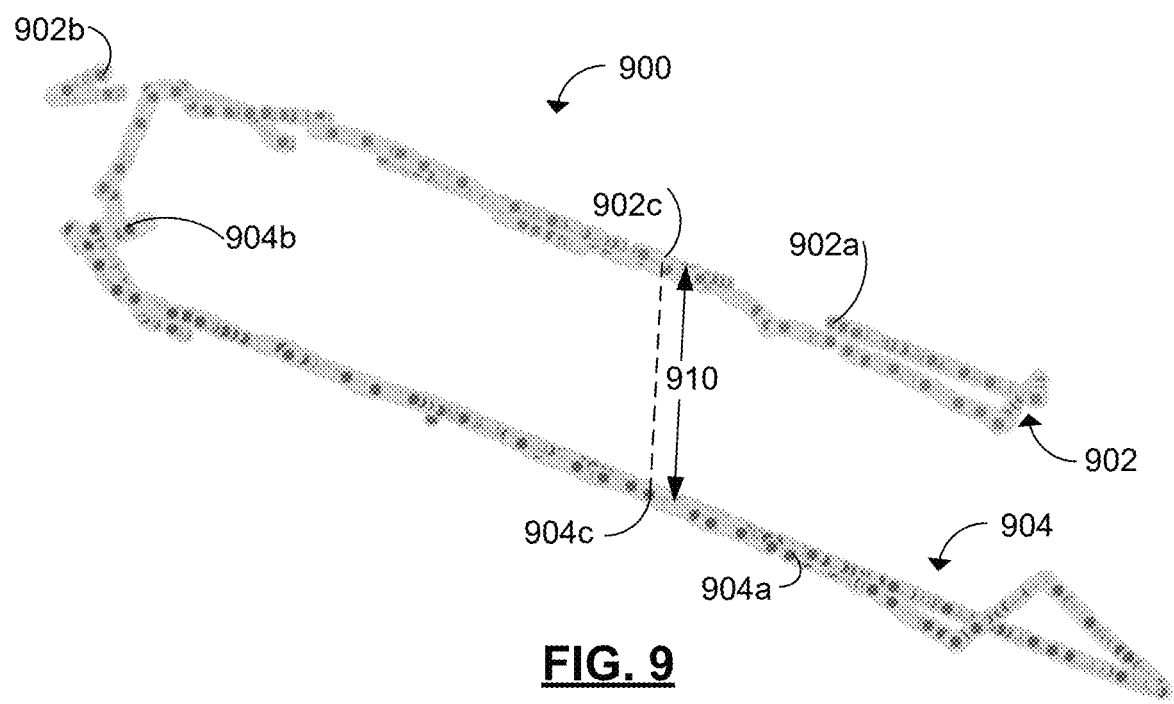
FIG. 9 shows a map diagram for two vessels loitering in the same vicinity in accordance with one or more embodiments.
Figure 10:
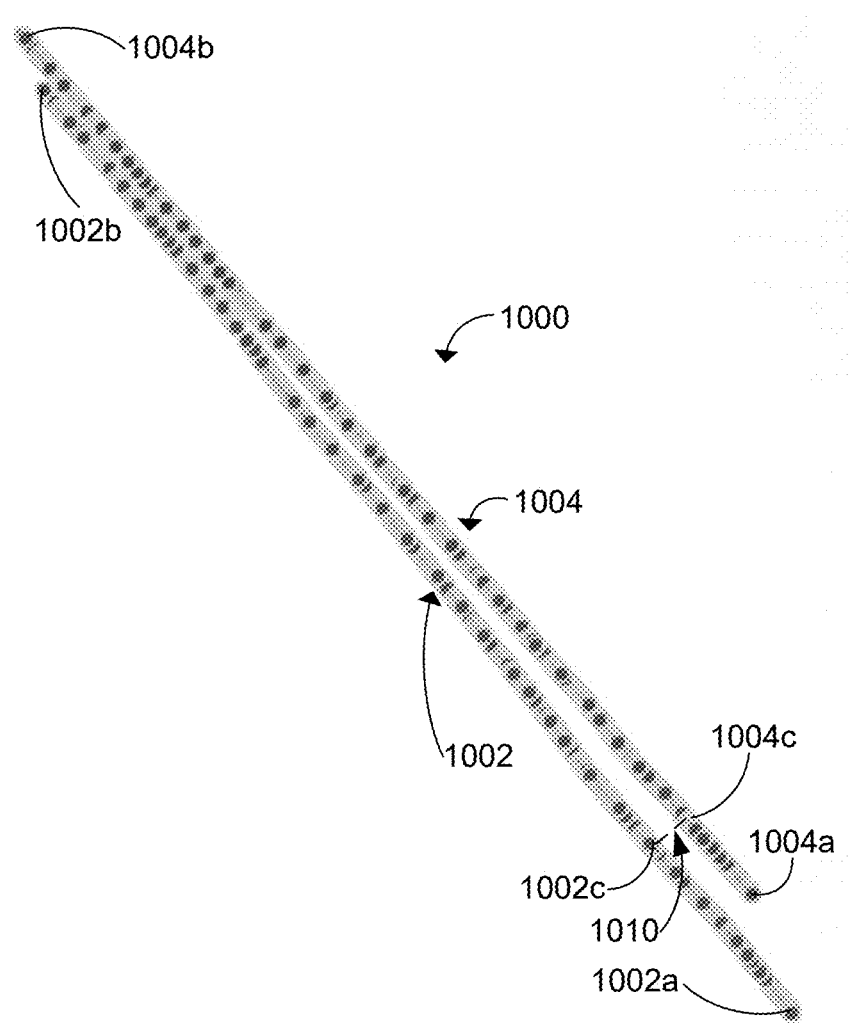
FIG. 10 shows a map diagram for two vessels engaged in a parallel course rendezvous in accordance with one or more embodiments.

Vessel rendezvous may be classified into different types, include a path crossing, such as shown in FIG. 8, two vessels loitering in the same vicinity as shown in FIG. 9, and a parallel course as described in FIG. 10. Other patterns of vessel rendezvous may also be identified and the vessels involved identified as involved in a rendezvous. While two vessels are shown in the same vicinity, there may be more than two vessels involved. The vessel rendezvous classification may also be stored in vessel rendezvous history database 512. The vessel rendezvous history database 512 may be provided to labeling data preparation 516.

At 514, a detected rendezvous may generate a rendezvous alarm 514. The rendezvous alarm 514 may be provided by SMS, email, application notification, notification in a user interface, or another alarm notification as known.

Figure 27:
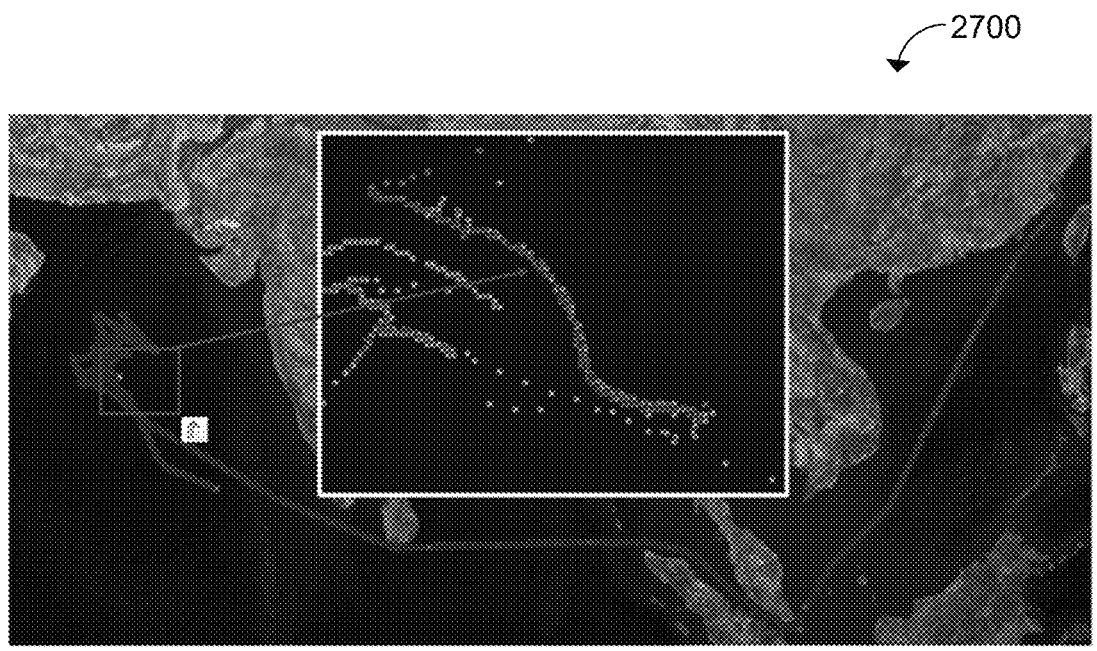
FIG. 27 shows an example detected rendezvous, in accordance with one or more embodiments.

An example detected rendezvous is shown in FIG. 27.

At 504, a vessel rendezvous prediction model 520 may be generated, and a vessel rendezvous classification model 522 may be generated.

At 516, the vessel rendezvous history data in database 512 is received and the constructed multi-source trajectories 424 are received. These two datasets may be combined or fused and stored in labeled dataset 518. The rendezvous history data in database 512 may be used as labels for the constructed multi-source trajectory data 424.

Figure 15:
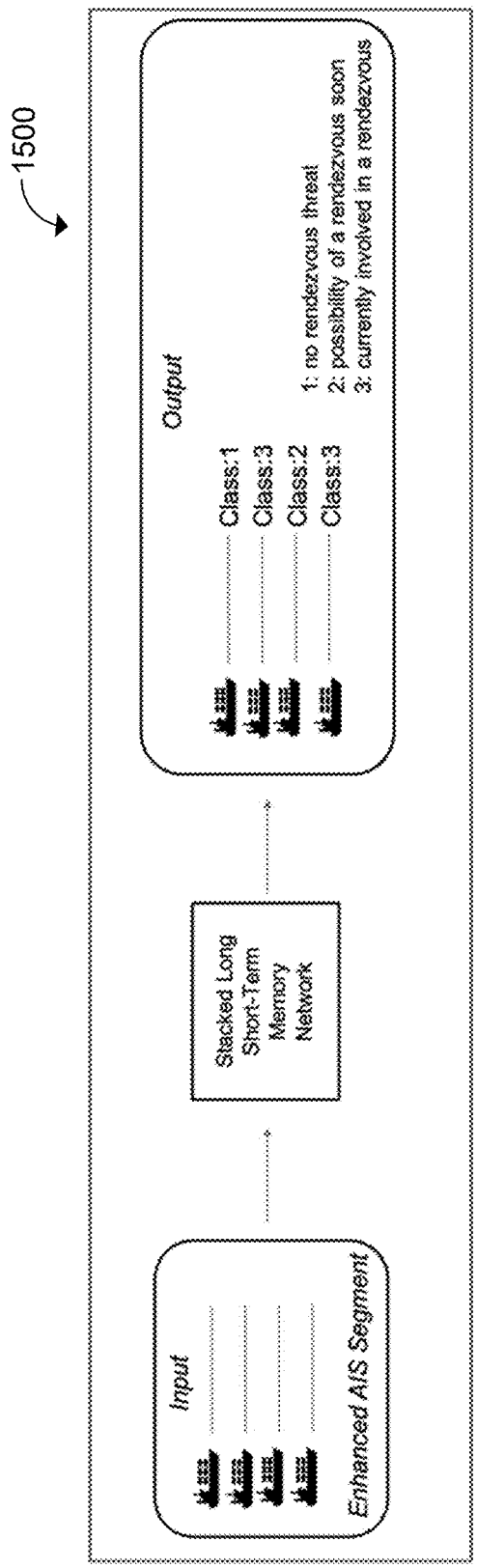
FIG. 15 shows an example vessel rendezvous model in accordance with one or more embodiments.

At 520 a rendezvous prediction model may be generated based on the labeled dataset 518 for predicting a rendezvous based on a vessel trajectory. The rendezvous prediction model 1500 may be a stacked LSTM model as described in FIG. 15. The input the prediction model accepts may include an enhanced vessel trajectory. The prediction model 1500 may generate an output classification including a class 1 of "no rendezvous threat", class 2 of "possibility of a rendezvous soon", and class 3 of "currently involved in a rendezvous".

For the training process, supervised learning may be used in which the model learns from historic vessel segments wherein each segment contains vessel data, a trajectory extracted from vessel tracking data, optical and radar images and RF data along with its corresponding label for rendezvous encounters. The historical dataset may be divided into at least two datasets comprising a training dataset and a test dataset. At least one model may be trained based on the training dataset and may be validated using the test dataset to determine at least one evaluated model. Finally, at least one rendezvous prediction model may be selected for the vessel based upon at least one evaluated model.

The generated rendezvous prediction model may be stored in rendezvous prediction trained model database 524.

Figure 14:
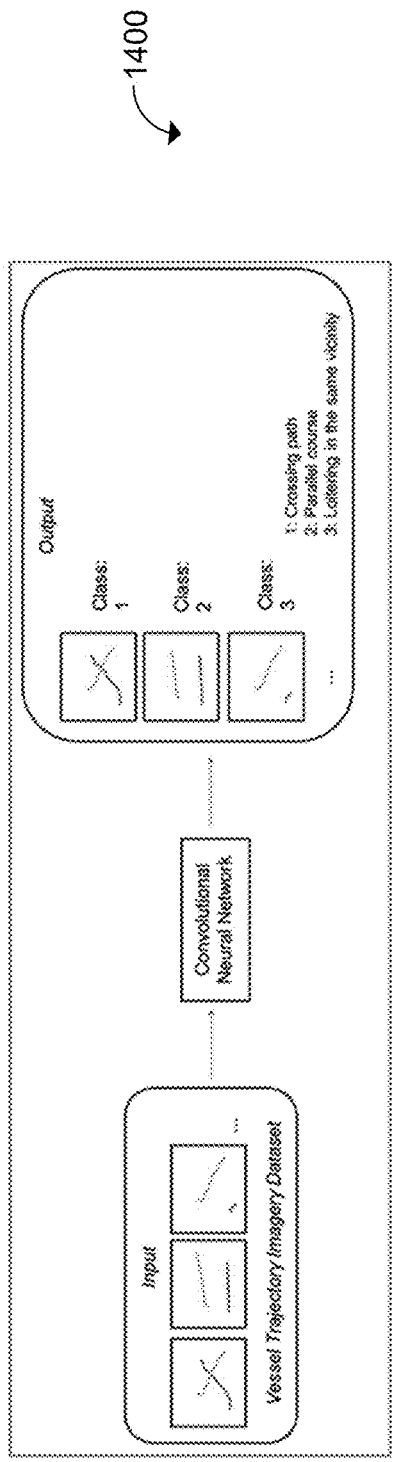
FIG. 14 shows an example vessel rendezvous classification model in accordance with one or more embodiments.

At 522, a rendezvous prediction classification model may be generated based on the labeled dataset 518 for predicting a rendezvous type based on a vessel trajectory. The rendezvous classification prediction model 1400 may be a convolutional neural network model as described in FIG. 14. The input the classification prediction model accepts may include a vessel trajectory image dataset. The prediction model 1400 may generate an output classification including a class 1 of "crossing path", class 2 of "parallel course", and class 3 of "loitering in the same vicinity".

For the training process, supervised learning may be used in which the model learns from historic vessel segments wherein each segment contains vessel data, trajectory extracted from vessel tracking data, optical and radar images and RF data along with its corresponding rendezvous class. The historical dataset may be divided into at least two datasets comprising a training dataset and a test dataset. At least one model may be trained based on the training dataset and may be validated using the test dataset to determine at least one evaluated model. Finally, at least one rendezvous class prediction model for the vessel may be based upon at least one evaluated model.

The generated rendezvous prediction classification model may be stored in rendezvous prediction trained model database 524.

At 506, a rendezvous prediction processing 506 may receive constructed vessel trajectories 426 and 428, rendezvous prediction trained model 520 and rendezvous classification prediction trained model 522, and may be deployed into production in a virtual machine or computer resulting into the rendezvous prediction type classification 526 and rendezvous prediction 528.

At 526, a prediction or inference about a vessel rendezvous classification (or rendezvous type) may be generated based upon vessel trajectory data 426. The vessel rendezvous classification 526 may be determined based on a trained rendezvous classification model received from trained model database 524 and a received constructed vessel trajectory 426. The vessel trajectory data 426 may include vessel trajectory imagery, including from one or more satellite imaging providers.

The prediction or inference may be generated at 526 by deploying the rendezvous prediction classification model trained based on the labeled dataset 518 at 522. The rendezvous classification prediction model 1400 used to make the prediction or inference about rendezvous classification may be a convolutional neural network model as described in FIG. 14. The input to the classification prediction model accepts may include vessel trajectory data, including vessel trajectory image dataset. The prediction model 1400 may generate an output classification including a class 1 of "crossing path", class 2 of "parallel course", and class 3 of "loitering in the same vicinity".

At 530, a rendezvous type (or class) prediction may be provided to a user. This may include providing a notification or an alert to a user.

At 528, a prediction or inference about a vessel rendezvous may be generated based upon vessel trajectory data 428. The prediction of a vessel rendezvous 528 may be generated based on a trained vessel rendezvous model received from trained model database 524 and received constructed vessel trajectories 428.

The prediction or inference may be generated at 528 using the rendezvous prediction model trained based on the labeled dataset 518 at 520. The rendezvous prediction model 1500 may be a stacked LSTM model as described in FIG. 15. The input the prediction model accepts may include an enhanced vessel trajectory. The prediction model 1500 may generate an output classification including a class 1 of "no rendezvous threat", class 2 of "possibility of a rendezvous soon", and class 3 of "currently involved in a rendezvous".

At 532, a prediction or inference about a vessel rendezvous class may be generated based on the vessel trajectory data 428.

Figure 6:
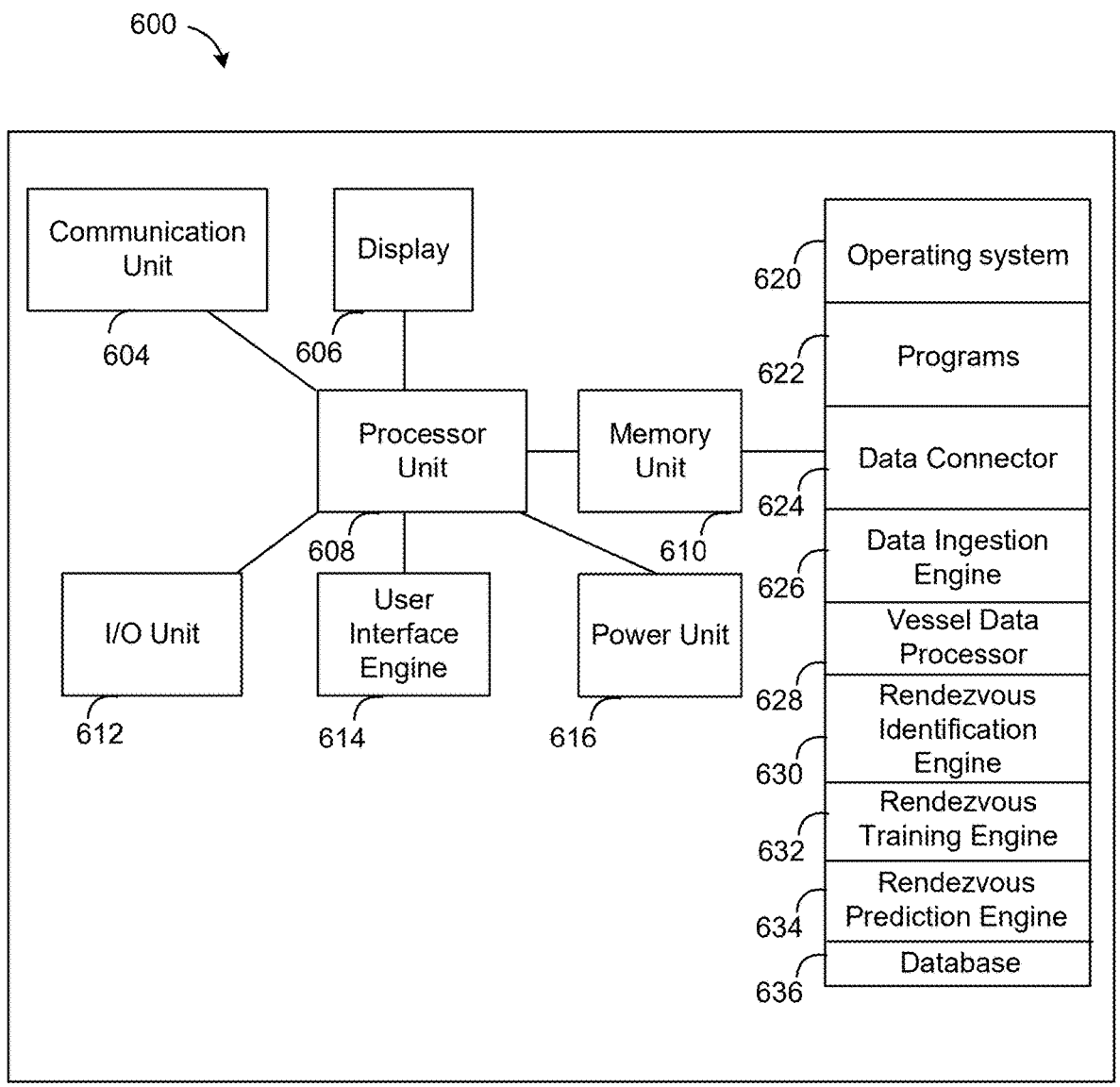
FIG. 6 shows a device diagram of a server in accordance with one or more embodiments.

Referring next to FIG. 6, a device 600 of a server is shown in accordance with one or more embodiments. The server 600 may be the server 108 of remote server 106 (see FIG. 1).

The server 600 has communication unit 604, display 606, I/O unit 612, processor unit 608, memory unit 610, user interface engine 614, and power unit 616. The memory unit 610 has operating system 620, programs 622, data connector 624, data ingestion engine 626, vessel data processor 628, rendezvous identification engine 630, vessel rendezvous training engine 632, rendezvous prediction engine 634 and database 636. The processing server 600 may be a virtual server on a shared host or may itself be a physical server.

The communication unit 604 may be a standard network adapter such as an Ethernet or 802.11x adapter. The processor unit 608 may include a standard processor, such as the Intel Xeon processor, for example. Alternatively, there may be a plurality of processors that are used by the processor unit 608 and may function in parallel. Alternatively, there may be a plurality of processors including a Central Processing Unit (CPU) and a Graphics Processing Unit (GPU). The GPU may be, for example, from the GeForce® family of GPUs from Nvidia®, or the Radeon® family of GPUs from AMD®. There may be a plurality of CPUs and a plurality of GPUs.

The processor unit 608 can also execute a user interface engine 614 that is used to generate various GUIs, some examples of which are shown and described herein, such as in FIGS. 12, 13, 25, 28, 29. The user interface engine 614 provides for vessel rendezvous layouts for users to configure, request, review, and respond to vessel rendezvous predictions and notifications, and the information submitted using these interfaces may be processed by the data ingestion engine 626, vessel data processor 628, rendezvous identification engine 630, rendezvous training engine 632, rendezvous prediction engine 634 and database 636. User interface engine 614 may be provided as an Application Programming Interface (API) or a Web-based application that is accessible via the communication unit 604.

I/O unit 612 provides access to server devices including disks and peripherals. The I/O hardware provides local storage access to the programs running on processing server 600.

The power unit 616 provides power to the processing server 600.

Memory unit 610 may have an operating system 620, programs 622, data connector 624, data ingestion engine 626, vessel data processor 628, rendezvous identification engine 630, rendezvous training engine 632, rendezvous prediction engine 634 and database 636.

The operating system 620 may be a Microsoft Windows Server® operating system, or a Linux-based operating system, or another operating system.

The programs 622 comprise program code that, when executed, configures the processor unit 608 to operate in a particular manner to implement various functions and tools for the processing server 600.

Data connector 624 may provide for integration, either push or pull with one or more vessel tracking provider servers 112 (see FIG. 1), and one or more $3^{rd}$ party data providers (such as vessel data or vessel information providers, one or more mapping providers, one or more regional boundary providers, one or more vessel incident providers, one or more radio-frequency data providers, and one or more satellite image providers. The integration may be an API integration as known, for example using an XML based REST API. The data connector 624 may transmit and receive requests and responses to the one or more vessel tracking provider servers, the one or more radio-frequency providers, the one or more satellite image providers, and the one or more 3rd party data providers using the communication unit 604.

Data ingestion engine 626 may receive data from the data connector 624, and may ingest and pre-process data from the one or more vessel tracking provider servers, the one or more radio-frequency providers, the one or more satellite image providers, and the one or more 3rd party data providers, as described in FIG. 3. The ingested data may be stored in database 636 and processed by vessel data processor 628.

Vessel data processor 628 may provide the functionality of data processor 406 and may receive data from the data ingestion engine 626 and from the database 636, and may determine one or more constructed multi-source vessel trajectories as described in FIG. 4. The vessel data processor 628 may send the determined parameters to the vessel rendezvous identification engine 630, the vessel rendezvous training engine 632, the vessel rendezvous prediction engine 634, and may store them in the database 636.

Rendezvous identification engine 630, rendezvous training engine 632, and rendezvous prediction engine 634 may receive region boundary data, vessel tracking data, vessel RF data, and vessel satellite image data from the data ingestion engine 626. The rendezvous identification engine 630 may provide the rendezvous identification functionality of 502 (see FIG. 5), rendezvous training engine 632 may provide the training functionality of 504 (see FIG. 5), and rendezvous prediction engine may provide the prediction functionality of 506 (see FIG. 5). The vessel rendezvous prediction engine 506 may provide the functionality of FIG. 7A. The vessel identification engine 630 and the rendezvous training engine 632 may provide the model generation functionality of FIG. 7B.

Optionally, database 636 may be hosted by server 600. The database may correspond to the database 110 (see FIG. 1). In an alternate embodiment, the database may run on a separate server from the server 600 and may be available via communication unit 604.

Figure 7A:
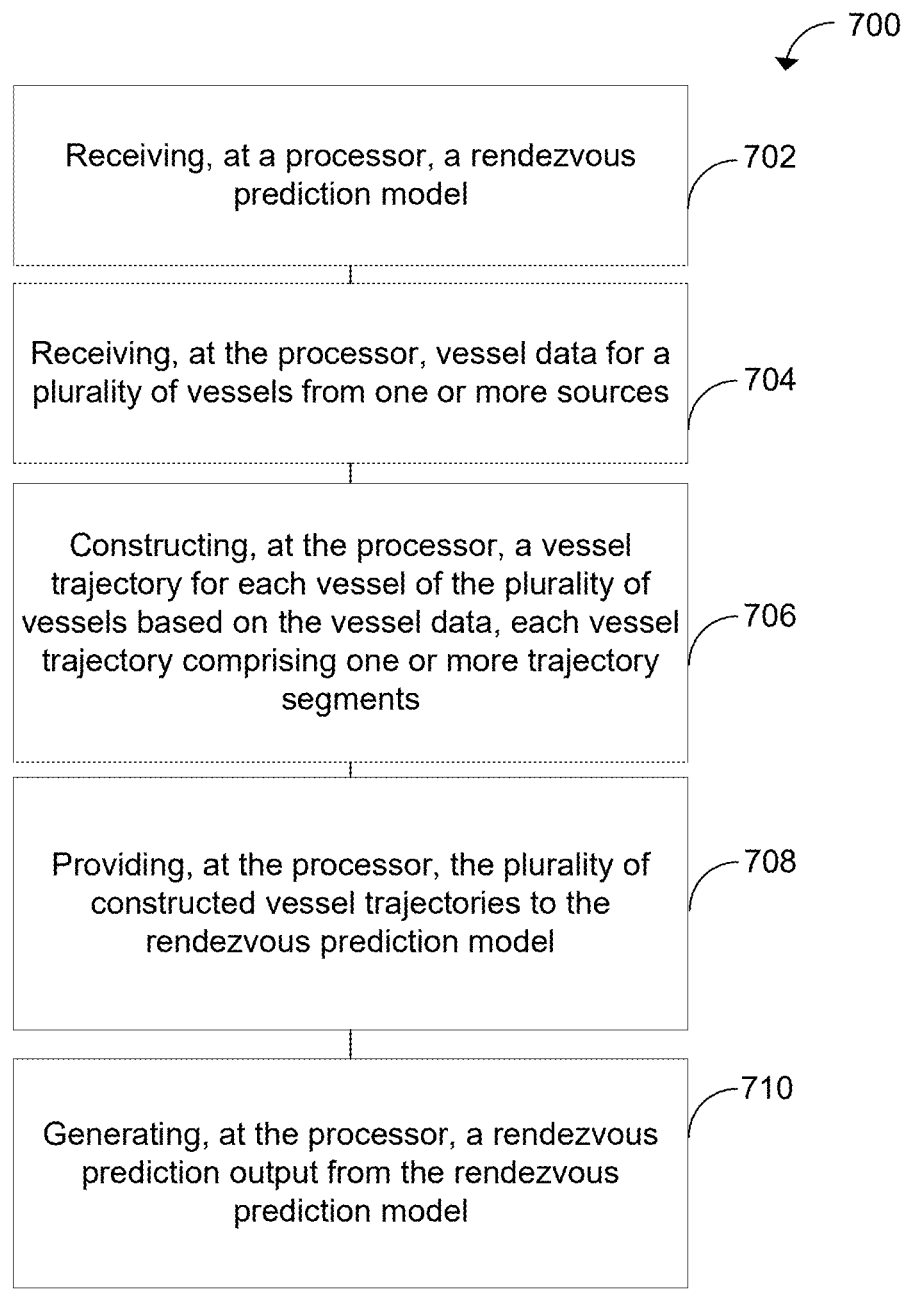
FIG. 7A shows a method diagram for predicting vessel rendezvous in accordance with one or more embodiments.

Referring next to FIG. 7A, there is shown a method 700 for predicting a vessel rendezvous in accordance with one or more embodiments.

At 702, a rendezvous prediction model is received at the processor.

At 704, vessel data for a plurality of vessels from one or more sources is received at the processor.

At 706, a vessel trajectory for each vessel of the plurality of vessels based on the vessel data, each vessel trajectory comprising one or more trajectory segments is constructed at the processor.

At 708, the plurality of constructed vessel trajectories is provided to the rendezvous prediction model at the processor.

At 710, a rendezvous prediction output from the rendezvous prediction model is generated at the processor.

In one or more embodiments, the method may further comprise: receiving, at the processor, region boundaries data from a region boundaries data source, the region boundaries data describing a plurality of regional boundaries; enhancing, at the processor, the vessel data with the plurality of region boundaries based on the region boundaries data; and wherein each of the plurality of constructed vessel trajectories may be constructed based on the enhanced vessel data.

In one or more embodiments, the rendezvous prediction output comprises an output selected from the group of: no rendezvous threat, threat of an imminent rendezvous, and involved in a rendezvous.

In one or more embodiments, the method may further comprise: receiving, at the processor, a rendezvous type classification model; converting, at the processor, the one or more trajectory segments of the plurality of constructed vessel trajectories corresponding to the predicted rendezvous output into images; providing, at the processor, the images to the rendezvous type classification model; and generating, at the processor, a rendezvous type classification output from the rendezvous type classification model.

In one or more embodiments, the vessel data may comprise at least one selected from the group of AIS data source, vessel information data from a vessel information source, radio frequency vessel data from a satellite radio frequency data source, satellite image data from an optical satellite image data source, and satellite image data from a radar satellite image data source.

In one or more embodiments, the rendezvous prediction classification model may comprise a convolution neural network.

In one or more embodiments, the rendezvous prediction model may be an LSTM.

In one or more embodiments, the rendezvous type classification output may comprise at least one selected from the group of a path crossing type, a parallel course type and a loitering in the same vicinity type.

Figure 7B:
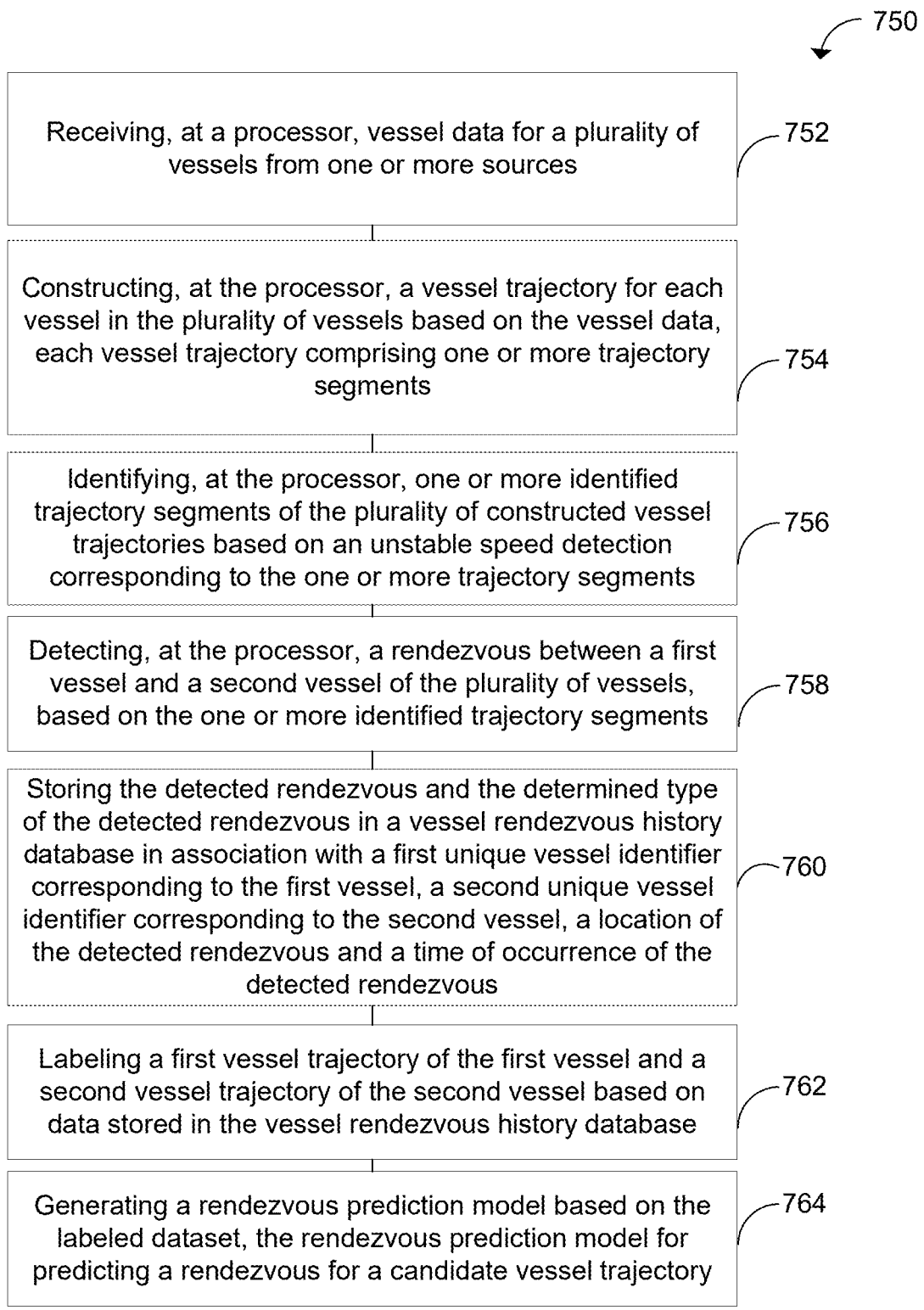
FIG. 7B shows a method diagram for generating a rendezvous prediction model in accordance with one or more embodiments.

Referring next to FIG. 7B, there is shown a method 750 for generating a rendezvous prediction model in accordance with one or more embodiments.

At 752, vessel data for a plurality of vessels from one or more sources is received, at a processor. The one or more sources may include one of the providers as described herein.

At 754, a vessel trajectory for each vessel in the plurality of vessels is constructed based on the vessel data at the processor, each vessel trajectory comprising one or more trajectory segments.

At 756, one or more identified trajectory segments of the plurality of constructed vessel trajectories based on an unstable speed detection are identified at the processor corresponding to the one or more trajectory segments.

At 758, a rendezvous between a first vessel and a second vessel of the plurality of vessels is detected based on the one or more identified trajectory segments.

At 760, the detected rendezvous and the determined type of the detected rendezvous are stored in a vessel rendezvous history database in association with a first unique vessel identifier corresponding to the first vessel, a second unique vessel identifier corresponding to the second vessel, a location of the detected rendezvous and a time of occurrence of the detected rendezvous.

At 762, a first vessel trajectory of the first vessel and a second vessel trajectory of the second vessel are labelled based on data stored in the vessel rendezvous history database.

At 764, a rendezvous prediction model is generated based on the labeled dataset, the rendezvous prediction model for predicting a rendezvous for a candidate vessel trajectory.

In one or more embodiments, the method may further comprise: receiving, at the processor, region boundaries data from a region boundaries data source, the region boundaries data describing a plurality of regional boundaries; enhancing, at the processor, the vessel data with the plurality of regional boundaries based on the region boundaries data; and wherein the constructing the plurality of constructed vessel trajectories may be further based on the enhanced vessel data.

In one or more embodiments, the method may further comprise: determining a type of the detected rendezvous based on the plurality of constructed vessel trajectories corresponding to the first vessel and the second vessel.

In one or more embodiments, the method may further comprise: storing, at a memory in communication with the processor, the plurality of constructed vessel trajectories in a vessel trajectories database; and storing, at the memory, the generated rendezvous prediction model.

In one or more embodiments, the method may further comprise: generating, at the processor, an alarm based on the detected rendezvous.

In one or more embodiments, the labeling may comprise labeling the stored plurality of constructed vessel trajectories using a label selected from the group of: no rendezvous threat, threat of an imminent rendezvous, and involved in a rendezvous.

In one or more embodiments, the rendezvous prediction model may comprise a long short term memory network.

In one or more embodiments, the method may further comprise: converting one or more trajectory segments of the plurality of constructed vessel trajectories labeled "involved in a rendezvous" into images; classifying the images into one or more types; generating a rendezvous type classification model based on the classified images; and storing the generated rendezvous type classification model in a database.

In one or more embodiments, the rendezvous type classification model may comprise a convolution neural network.

In one or more embodiments, the one or more types may include a type selected from a list comprising path crossing type, parallel course type and loitering in the same vicinity type.

In one or more embodiments, the vessel data may include one or more of an AIS data from an AIS data source, a vessel information data from a vessel information source, a radio frequency vessel data from a satellite radio frequency data source, satellite image data from an optical satellite image data source, and satellite image data from a radar satellite image data source.

In one or more embodiments, the method may further comprise: identifying and classifying a vessel in the satellite image data using a Deep Learning method.

Referring next to FIG. 8, there is shown a map diagram 800 for two vessels engaged in a rendezvous in accordance with one or more embodiments. The rendezvous detection 502 (see FIG. 5) may identify rendezvous events of a vessel.

A first vessel may follow track or route 802 and a second vessel may follow track or route 804. Two vessels may navigate, and rendezvous while each is along a route. The vessel trajectory data segment for the detected rendezvous for the first vessel may begin at 802a and end at 802b, and for the second vessel may begin at 804a and end at 804b. The series of points along the first vessel route 802 may correspond to the same time frame as second vessel route 804.

The rendezvous detection 502 (see FIG. 5) may identify the series of points in the route 802 and 804 as indicative of a rendezvous between the first vessel and the second vessel.

Referring next to FIG. 9, there is shown a map diagram 900 of two vessels loitering in the same vicinity in accordance with one or more embodiments. Two vessels may remain in close proximity while crew transfer occurs, and the rendezvous may involve both vessels loitering while rendezvous takes place. The rendezvous detection 502 (see FIG. 5) may identify rendezvous events of a vessel.

A first vessel may follow track or route 902 and a second vessel may follow track or route 904. The vessel trajectory segment for the detected rendezvous for the first vessel may begin at 902a and end at 902b, and for the second vessel may begin at 904a and end at 904b. The series of points along the first vessel route 902 may correspond to the same time frame as second vessel route 904.

The rendezvous detection 502 (see FIG. 5) may identify the series of points in the route 902 and 904 as indicative of a rendezvous between the first vessel and the second vessel.

Referring next to FIG. 10, there is shown a map diagram 1000 of two vessels engaged in a parallel course rendezvous in accordance with one or more embodiments. Two vessels may travel in a parallel course while crew transfer occurs, and the rendezvous may involve both vessels moving together in a parallel fashion. The rendezvous detection 502 (see FIG. 5) may identify rendezvous events of a vessel.

A first vessel may follow track or route 1002 and a second vessel may follow track or route 1004. The vessel trajectory segment for the detected rendezvous for the first vessel may begin at 1002a and end at 1002b, and for the second vessel may begin at 1004a and end at 1004b. The series of points along the first vessel route 1002 may correspond to the same time frame as second vessel route 1004.

The rendezvous detection 502 (see FIG. 5) may identify the series of points in the route 1002 and 1004 as indicative of a rendezvous between the first vessel and the second vessel.

Referring next to FIG. 11, there is shown map diagram 1100 for port visit identification in accordance with one or more embodiments. The vessel location messages or vessel trajectory of the vessels may be received and segmented into individual trips (port to port), and may be further segmented into portions of an individual trip. The segmentation may assist in identifying the location of the vessel relative to one or more ports. The individual segments may involve determining parameters between a start point of the segment and an end point of the segment known as parameters that include distance travelled, speed, acceleration, jerk, bearing, and bearing rate.

The positional data of the vessel tracking messages may be spatially joined with different geometric location of ports, marine regions, and Exclusive Economic Zones (EEZ) encoded in shapefiles. A shapefile may be a simple, nontopological format for storing the geometric location and attribute information of geographic features. Geographic features in a shapefile may be represented by points, lines, or polygons (areas).

The marine region and EEZ shapefiles may be similar to those produced by Flander Marine Institute, which maintains a database of international borders in open waters. The EEZ may be modified or adjusted in order to improve data processing performance by reducing the size of the shapefile. This may be achieved by generating a one-way buffer in land for the EEZ. This may simplify the geometry around the coastline and allow for joining of vessel tracking messages that may be immediately at the land boundary. The buffering may also prevent an increase in the extent of a countries EEZ.

The port shapefiles may be generated using a tool, for example the World Port Index ports. The ports may be converted into points and may be buffered to generate port zone shapefiles.

The join operator between the shapefiles and vessel tracking positions may output the corresponding location identification on which each vessel tracking message is reported in. This information may be used for selecting region or geographically specific analysis (including determination of geographically specific profile data).

The vessel tracking data may be joined to a region identifier (Region ID) and a Port identifier (Port ID) to one or more segments of vessel tracking data, vessel RF data, and vessel satellite image data as described herein.

A trip for a first vessel is displayed at 1102, including one or more segments. On the open ocean, the vessel tracking data is enhanced to join a region identifier (0) and port identifier (0). A region ID and a port ID of 0 may identify that the associated vessel tracking data is not associated with a particular region or port respectively. As the vessel proceeds from the ocean into the marine region defined off the coast of Turkey, the vessel tracking data may be enhanced to indicate that the vessel has entered the Iskenderun port region 1106 (noted as Port ID 44880 in port visit indication 1104). The vessel may later move to the Yakacik port region 1110, and the vessel tracking data may be enhanced to indicate that it has entered the port (noted as Port ID 44803 in port visit indication 1110).

The vessel's track/route may be visualized on a map user interface such as the one shown in map diagram 1100. The visualization may include an indication of a port visit 1104 that may include a vessel identifier (for example, the MMSI), the port identifier, a time of entry into the port, a time of exit into the port, and a number of vessel tracking messages which are received.

The second port visit to Yakacik port region may be provided as another indication of a port visit 1108 that may include a vessel identifier (for example, the MMSI), the port identifier, a time of entry into the port, a time of exit into the port, and a number of vessel tracking messages which are received.

Figure 12:
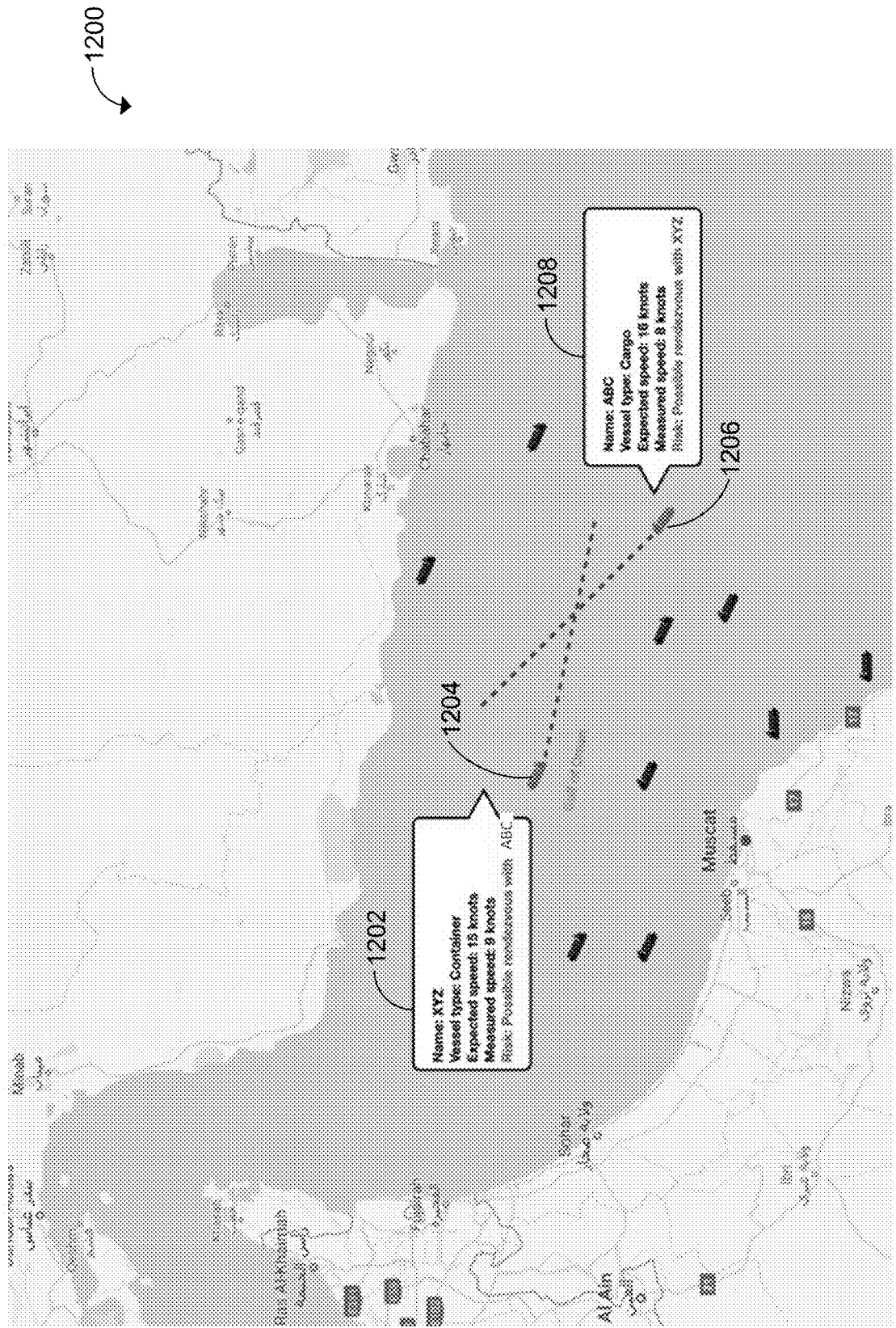
FIG. 12 shows a rendezvous prediction notification in accordance with one or more embodiments.

Referring next to FIG. 12, there is shown a rendezvous prediction notification user interface 1200 in accordance with one or more embodiments. The user interface 1200 includes a first vessel 1204, a second vessel 1206, a first notification or alert 1202 associated with the first vessel 1204, and a second notification or alert 1208 associated with the second vessel 1206.

In this case, a user using the user interface 1200 is notified of a predicted rendezvous between the first vessel 1204 and the second vessel 1206.

The first notification 1202 for the first vessel 1204 includes a vessel name, a vessel type, an expected speed, a measured speed, and a predicted risk explanation, i.e. "possible rendezvous with vessel ABC".

The second notification 1208 for the second vessel 1206 includes a vessel name, a vessel type, an expected speed, a measured speed, and a predicted risk explanation, i.e. "possible rendezvous with vessel XYZ".

The first notification 1202 and the second notification 1208 may be sent via text message, SMS message, application notification in a user interface, email message, phone notification, or another notification system as known. There may be multiple recipients of the notification. The notification may include a link to the user interface provided by the assessment service 106. The first notification 1202 and the second notification 1208 may provide a notification or alarm of a predicted future rendezvous of the first vessel 1204 and the second vessel 1206.

Figure 13:
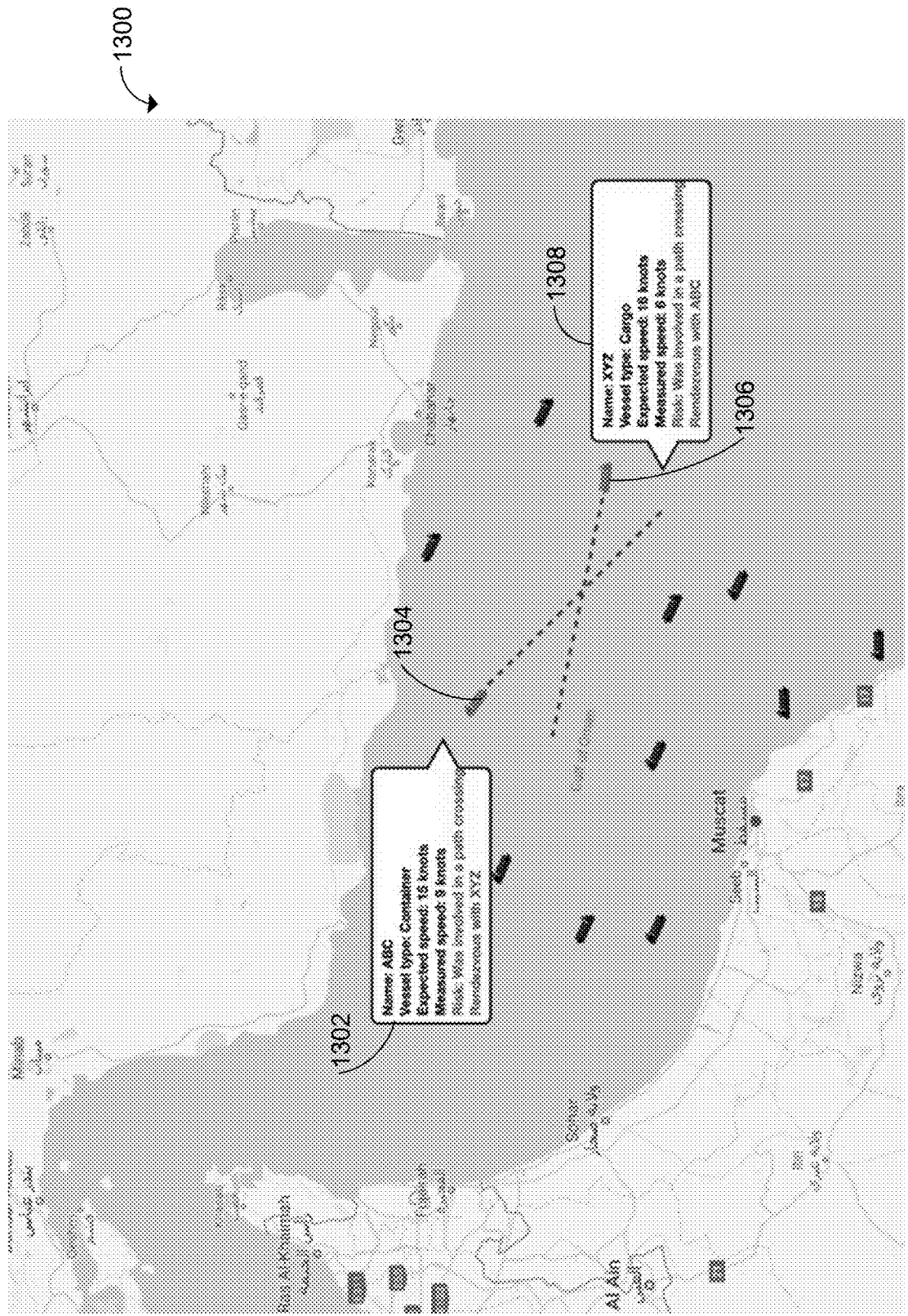
FIG. 13 shows a rendezvous detection notification in accordance with one or more embodiments.

FIG. 13 shows a rendezvous detection notification user interface 1300 in accordance with one or more embodiments. The user interface 1300 includes a first vessel 1304, a second vessel 1306, a first notification or alert 1302 associated with the first vessel 1304, and a second notification or alert 1308 associated with the second vessel 1306.

In this case, a user using the user interface 1300 is notified of a detected rendezvous between the first vessel 1304 and the second vessel 1306.

The first notification 1302 for the first vessel 1304 includes a vessel name, a vessel type, an expected speed, a measured speed, and a detected risk explanation, i.e. "Was involved with a path crossing rendezvous with XYZ".

The second notification 1308 for the second vessel 1306 includes a vessel name, a vessel type, an expected speed, a measured speed, and a detected risk explanation, i.e. "Was involved with a path crossing rendezvous with ABC".

The first notification 1302 and the second notification 1308 may be sent via text message, SMS message, application notification, email message, phone notification, or another notification system as known. There may be multiple recipients of the notification. The notification may include a link to the user interface provided by the assessment service 106. The first notification 1302 and the second notification 1308 may provide a notification or alarm of a detected past rendezvous of the first vessel 1304 and the second vessel 1306.

Figure 28:
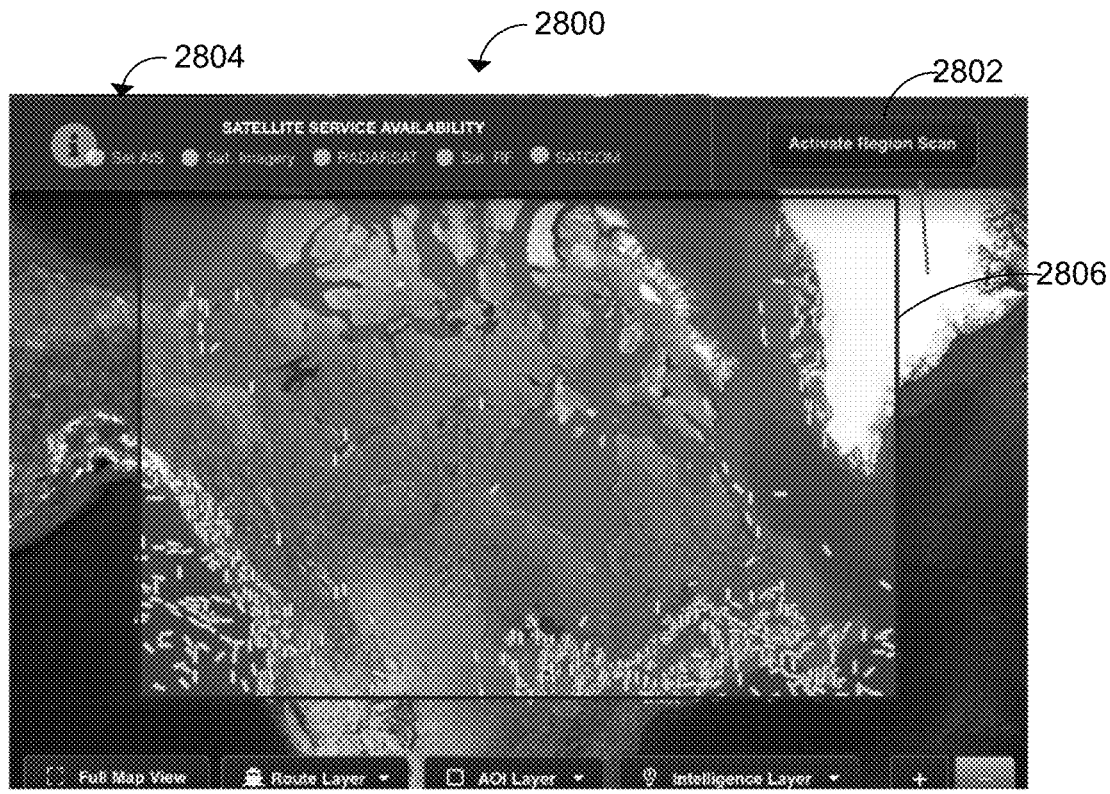
FIG. 28 shows a user interface diagram in accordance with one or more embodiments.

Referring next to FIG. 28, there is shown a user interface diagram 2800 in accordance with one or more embodiments. The user interface 2800 may be generated by the user interface engine 614 (see FIG. 6) and may be provided to an end user by way of a downloaded app on their user device in communication with server 108 (see FIG. 1), or by way of a web interface provided by server 108 (see FIG. 1).

The user interface 2800 may show a map including one or more maritime regions, EEZs or ports and one or more vessels. Communication status 2804 with one or more data providers may be displayed. The user may proceed by selecting the "Activate Region Scan" button 2802 which may begin vessel rendezvous detection or prediction for one or more vessels.

The user interface 2800 may include a selectable box 2806 that may enable a user to select on the map a particular region or regions for the region scan when the "Activate Region Scan" button 2802 is selected.

Figure 29:
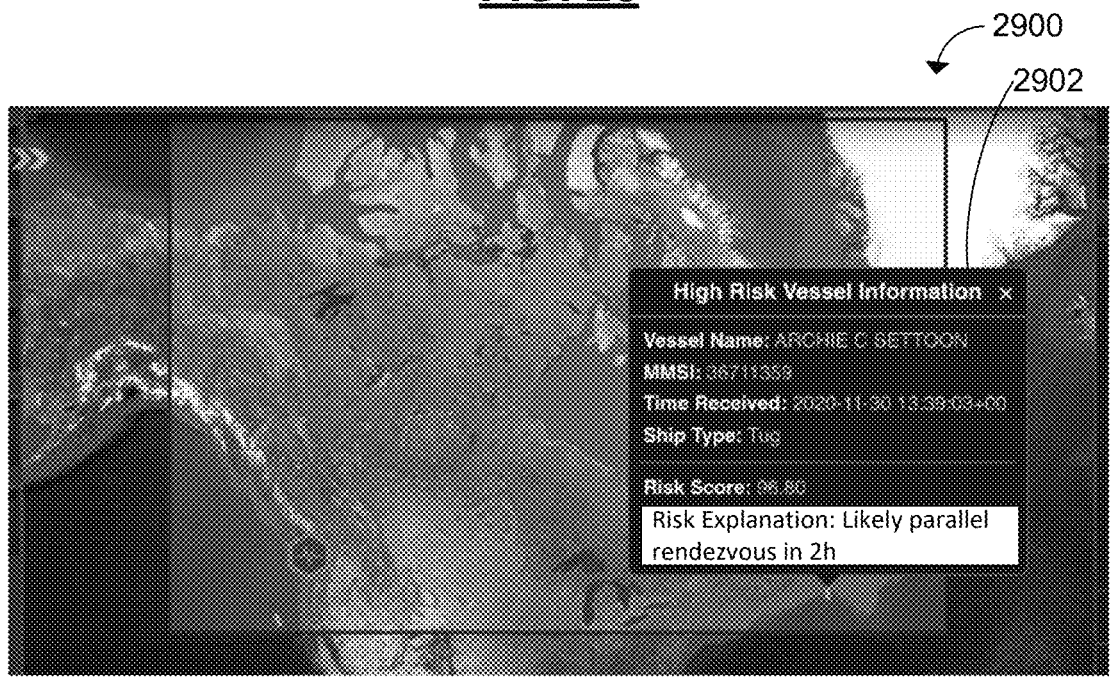
FIG. 29 shows another user interface diagram in accordance with one or more embodiments.

Referring next to FIG. 29, there is shown another user interface diagram 2900 in accordance with one or more embodiments. Responsive to the user's selection of the "Activate Region Scan" button 2902, vessel rendezvous detection or prediction may be performed on the one or more vessels in the selected marine region. The user interface 2900 may display any vessels in the one or more vessels having detected or predicted rendezvous notification. The user may select a vessel, and may be presented with a vessel rendezvous window 2902 summarizing the reasons for the vessel rendezvous detection or prediction notification.

For example, the rendezvous window 2902 shows a vessel name, MMSI, vessel tracking message timestamp, ship type, risk score, and risk explanation. The rendezvous window 2902 may show information related to the vessel tracking data, determined vessel profile information, vessel incident information, vessel information, and vessel rendezvous detections or predictions.

The risk score may be a determined confidence value of the vessel rendezvous prediction, or a score related to the overall risk score determined based on the model prediction (see FIG. 5).

The rendezvous risk explanation may show a rationale for the risk score, or one or more significant contributing parameters to the score. In this example, the risk score is 96, and the explanation is that the vessel has a likely parallel rendezvous in 2 h.

Figure 30:
FIG. 30 shows another user interface diagram in accordance with one or more embodiments.

Referring next to FIG. 30, there is shown another user interface diagram 3000 in accordance with one or more embodiments.

The user interface diagram 3000 may be displayed when the user selects the high-risk vessel displayed in rendezvous window 2902 (see FIG. 29). In response to the selection, additional summary information may be displayed in a details window 3002.

The details window 3002 may show a summary of the data associated with the vessel identified in rendezvous window 2902, other vessels (for example, other vessels of the same type as the vessel identified in rendezvous window 2902), and notes information.

The user may select the "Vessel Note" button 3004 in order to create, edit, or remove the entries under the Vessel Notes section of the details window 3002.

Figure 31:
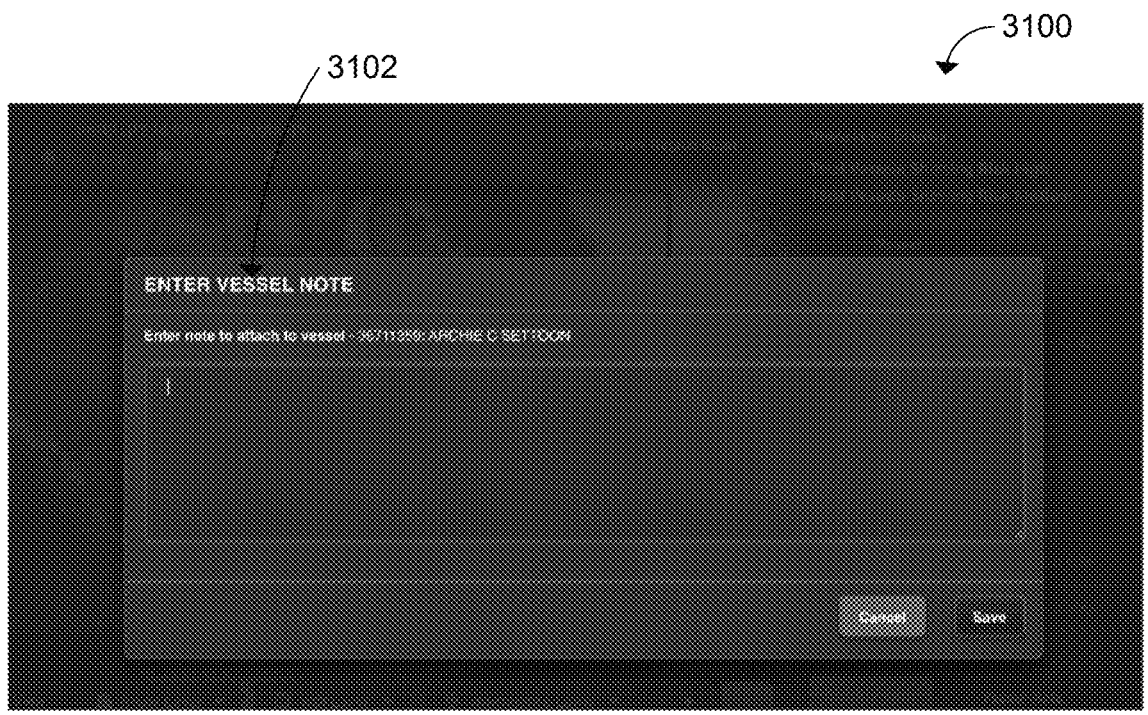
FIG. 31 shows another user interface diagram in accordance with one or more embodiments.

Referring next to FIG. 31, there is shown another user interface diagram 3100 in accordance with one or more embodiments.

Responsive to the user's selection of the "Vessel Note" button 3004, a Vessel Note window 3102 may be displayed. The vessel note window may allow for a variety of different user inputs with respect to the vessel rendezvous detection or rendezvous prediction notification shown in rendezvous window 3002. While a text box is shown in note window 3102, it is understood that a variety of user input types may be submitted by the user. This may allow a user to review the details of a rendezvous notification, and then submit feedback to the server 108 (see FIG. 1). In this manner, the user interface may allow for user feedback on rendezvous notifications. The feedback data corresponding to the rendezvous notification may be received by server 108, and stored in database 110 (see FIG. 1).

The present invention has been described here by way of example only. Various modification and variations may be made to these exemplary embodiments without departing from the spirit and scope of the invention, which is limited only by the appended claims.

We claim:

1. A computer implemented method for generating a future vessel rendezvous prediction output, the method comprising:
   receiving, at a processor, a rendezvous prediction model;
   receiving, at the processor, vessel data for a plurality of vessels from one or more sources;
   receiving, at the processor, updated vessel data for the plurality of vessels from the one or more sources, the updated vessel data comprising data collected subsequent to the vessel data;
   constructing, at the processor, a future vessel trajectory for each vessel of the plurality of vessels based on the vessel data and the updated vessel data, each future vessel trajectory comprising one or more trajectory segments;
   identifying, at the processor, at least one unstable speed segment of the one or more trajectory segments;
   providing, at the processor, the plurality of constructed future vessel trajectories and the at least one unstable speed segment to the rendezvous prediction model;
   generating, at the processor, the future rendezvous prediction output from the rendezvous prediction model, the rendezvous prediction output comprising a risk score and a risk explanation; and
   outputting a user interface comprising a map, at least two vessel icons positioned on the map accompanied by the risk score and the risk explanation based on the updated vessel data, and the future rendezvous prediction output associated with the at least two vessel icons.

2. The method of claim 1 further comprising:
   receiving, at the processor, region boundaries data from a region boundaries data source, the region boundaries data describing a plurality of regional boundaries;
   enhancing, at the processor, the vessel data with the plurality of region boundaries based on the region boundaries data; and
   wherein each of the plurality of constructed future vessel trajectories are constructed based on the enhanced vessel data.

3. The method of claim 1 wherein the future rendezvous prediction output comprises an output selected from the group of: no rendezvous threat, threat of an imminent rendezvous, and involved in a rendezvous.

4. The method of claim 3 further comprising:
   receiving, at the processor, a rendezvous type classification model;
   converting, at the processor, the one or more trajectory segments of the plurality of constructed future vessel trajectories corresponding to the future vessel rendezvous prediction output into images;
   providing, at the processor, the images to the rendezvous type classification model; and generating, at the processor, a rendezvous type classification output from the rendezvous type classification model.

5. The method of claim 4, wherein the rendezvous type classification output comprises at least one selected from the group of a path crossing type, a parallel course type and a loitering in the same vicinity type.

6. The method of claim 1, wherein the vessel data comprises at least one selected from the group of AIS data source, vessel information data from a vessel information source, radio frequency vessel data from a satellite radio frequency data source, satellite image data from an optical satellite image data source, and satellite image data from a radar satellite image data source.

7. The method of claim 1, wherein the future rendezvous prediction model comprises one or more long short term memory networks.

8. The method of claim 1, wherein generating the future rendezvous prediction output is based on the at least one unstable speed segment of the one or more trajectory segments.

9. A computer-implemented system for generating a future vessel rendezvous prediction output, the system comprising:
a memory comprising:
a rendezvous prediction model;
a network device;
a processor in communication with the memory and the network device, the processor configured to:
receive, via the network device, vessel data for a plurality of vessels from one or more sources;
receive updated vessel data for the plurality of vessels from the one or more sources, the updated vessel data comprising data collected subsequent to the vessel data;
construct a future vessel trajectory for each vessel in the plurality of vessels based on the vessel data and the updated vessel data, each future vessel trajectory comprising one or more trajectory segments;
identify at least one unstable speed segment of the one or more trajectory segments;
provide the plurality of constructed future vessel trajectories and the at least one unstable speed segment as input to the rendezvous prediction model;
generate the future rendezvous prediction output from the rendezvous prediction model, the rendezvous prediction output comprising a risk score and a risk explanation; and
output a user interface comprising a map, at least two vessel icons positioned on the map accompanied by the risk score and the risk explanation based on the updated vessel data, and the future rendezvous prediction output associated with the at least two vessel icons.

10. The system of claim 9, wherein the processor is further configured to:
receive, via the network device, region boundaries data from a region boundaries data source, the region boundaries data describing a plurality of regional boundaries;
enhance the vessel data with the plurality of region boundaries based on the region boundaries data; and
wherein each of the plurality of constructed future vessel trajectories are based on the enhanced vessel data.

11. The system of claim 9, wherein the future rendezvous prediction output comprises an output selected from the group of: no rendezvous threat, threat of an imminent rendezvous, and involved in a rendezvous.

12. The system of claim 11, wherein the memory further comprises a rendezvous type classification model; and
wherein the processor is further configured to:
convert the one or more trajectory segments of the plurality of future vessel trajectories corresponding to the future vessel rendezvous prediction output into images;
provide the images to the rendezvous type classification model as input; and
generate a rendezvous type classification output from the rendezvous type classification model.

13. The system of claim 12, wherein the rendezvous type classification output comprises at least one selected from the group of a path crossing type, a parallel course type and a loitering in the same vicinity type.

14. The system of claim 9, wherein the vessel data comprises at least one selected from the group of AIS data source, vessel information data from a vessel information source, radio frequency vessel data from a satellite radio frequency data source, satellite image data from an optical satellite image data source, and satellite image data from a radar satellite image data source.

15. The system of claim 9, wherein the rendezvous prediction model comprises one or more long short term memory networks.

16. The system of claim 9, wherein the future rendezvous prediction output is generated based on the at least one unstable speed segment of the one or more trajectory segments.

* * * * *